United States Patent
Debique

(10) Patent No.: US 10,839,008 B2
(45) Date of Patent: Nov. 17, 2020

(54) SYSTEM AND METHOD FOR NATURAL LANGUAGE MUSIC SEARCH

(71) Applicant: Sync Floor, Inc., Seattle, WA (US)

(72) Inventor: Kirt Debique, Seattle, WA (US)

(73) Assignee: Sync Floor, Inc., Seattle, WA (US)

( * ) Notice: Subject to any disclaimer, the term of this patent is extended or adjusted under 35 U.S.C. 154(b) by 138 days.

(21) Appl. No.: 15/881,416

(22) Filed: Jan. 26, 2018

(65) Prior Publication Data
US 2019/0012381 A1   Jan. 10, 2019

Related U.S. Application Data

(60) Provisional application No. 62/529,293, filed on Jul. 6, 2017.

(51) Int. Cl.
| | |
|---|---|
| *G06F 16/68* | (2019.01) |
| *G06F 16/61* | (2019.01) |
| *G06F 16/638* | (2019.01) |
| *G06F 16/9535* | (2019.01) |
| *G06F 16/2457* | (2019.01) |
| *G06F 16/683* | (2019.01) |

(52) U.S. Cl.
CPC ...... *G06F 16/686* (2019.01); *G06F 16/24578* (2019.01); *G06F 16/61* (2019.01); *G06F 16/638* (2019.01); *G06F 16/683* (2019.01); *G06F 16/9535* (2019.01)

(58) Field of Classification Search
None
See application file for complete search history.

(56) References Cited

U.S. PATENT DOCUMENTS 8,897,820 B2 * 11/2014 Marovets .............. H04W 8/245
455/466
9,165,556 B1   10/2015 Sugar et al.
(Continued)

OTHER PUBLICATIONS

International Preliminary Report on Patentability for PCT Application No. PCT/US2018/038100, dated Jan. 16, 2020, 10 pages.
(Continued)

*Primary Examiner* — Kim T Nguyen
(74) *Attorney, Agent, or Firm* — Shook, Hardy & Bacon L.L.P.

(57) ABSTRACT

Various methods and systems are provided for implementing a search engine that generates search results for a natural language description of music. A music description and categorization schema is defined to provide a common terminology and taxonomy. Music catalogs are ingested to generate a searchable catalog index. A natural language description of music is analyzed using various natural language processing techniques to generate corresponding musical features of the schema to be searched. A query string is generated from the musical features using a query term profile including one or more query term generators. A ranking score and other search result statistics are generated. Various visualizations can be provided, including a visualization of the translated search and a visualization of search results. In some embodiments, word clouds are provided to allow a user to filter search results by a selected matched feature. As such, users can efficiently review search results.

20 Claims, 20 Drawing Sheets

(56) References Cited

U.S. PATENT DOCUMENTS

| | | | | |
|---|---|---|---|---|
| 9,237,062 B2* | 1/2016 | Ermis | .................. | H04L 41/024 |
| 2009/0083032 A1* | 3/2009 | Jablokov | ................. | H04W 8/20 |
| | | | | 704/235 |
| 2011/0196666 A1 | 8/2011 | Ruetz et al. | | |
| 2014/0380286 A1* | 12/2014 | Gabel | .................... | G06N 5/022 |
| | | | | 717/139 |
| 2015/0033079 A1 | 1/2015 | Qiu et al. | | |
| 2015/0081690 A1* | 3/2015 | Arom | ...................... | G06F 16/68 |
| | | | | 707/728 |
| 2015/0100943 A1* | 4/2015 | Gabel | ...................... | G06F 8/30 |
| | | | | 717/106 |
| 2015/0379133 A1* | 12/2015 | Basovnik | ............ | G06F 16/2358 |
| | | | | 707/711 |
| 2017/0060990 A1* | 3/2017 | Brown | .................. | G06F 16/532 |

OTHER PUBLICATIONS

International Search Report and Written Opinion in International Application No. PCT/US18/38100, dated Sep. 7, 2018, 14 pages.

* cited by examiner

800

---

What is the perfect song?

[bear's den,] [bon iver,] [folk,] hope in relationships.. [indie] [folk,] [lyrics about,] [melancholic,] [modern,] ni... 810 815 Edit Search

[Search] Marketplace Candidates ⓘ
820  822  824

Terms  830

Title — Hey guys ⌣ 832

Deadline — Mon, 19 Jun 2017 11:13:33 -0700 ⌣ 834

Budget — $15,000 ⌣ 836

Search  840

Hey guys
I'm helping a TV commercial client find music for a spot about a night drive with the whole family in [spring] time. The music should be [warm,] [positive] and maybe a little bit [melancholic,] but with a [nice pace.] We are open to [Singer Songwriter] a la [Bon Iver] up to [Indie Folk] a la [The Lumineers] and [Of Monsters and Men.] We are also open to artists like [Bear's Den,] and maybe that guy [The Tallest Man on Earth.] ⌣ 845
We ~~do not want new americana, and nothing too mainstream.~~ A song with a mood we love is In Every Direction by Junip. A [modern] take on the genre would be a plus and [lyrics about] hope in relationships. I've got a budget for this of 15K.
Thanks!

850  857

Schema Features extracted  [Edit]

*dynamic, happy, euphoric, minimal, mellow, vocals with music, midtempo, uptempo, contemporary, new, 00s, 2010 and later,* rhythmic, emotional, danceable, emotional reflective, reflective, clean, studio, organic acoustic or electric, ⌣ 855
electric or electronic, acoustic, organic electric or electronic, energetic intro, energetic outtro, multiple crescendos, downtempo, known, noteworthy 860  867

Genres extracted  [Edit]

*singer songwriter, singer-songwriter, folk, indie folk,* chamber pop, folk-pop, indie pop, indie rock, melancholia, neo mellow, slow core, stomp and holler, pop, icelandic pop, metropopolis, indie anthem-folk, stomp and flutter, freak folk ⌣ 865

870  877

Related Artists extracted  [Edit]

*bon iver, the lumineers, of monsters and men, bear's den, the tallest man on earth,* iron & wine, the national, fleet foxes, volcano choir, james vincent mcmorrow, sufjan stevens, s.carey, gregory alan isakov, josé gonzález, blind pilot, local natives, alexi murdoch, the head and the heart, phosphorescent, the antlers, band of horses, benjamin francis leftwich, grizzly bear, edward sharpe & the magnetic zeros, the avett brothers, mumford & sons, vance joy, the civil wars, noah and the whale, the oh hellos, ben howard, houndmouth, lord huron, grouplove, young the giant, dawes, shakey graves, bahamas, radical face, ⌣ 875
grizfolk, walk the moon, atlas genius, passion pit, matt and kim, the naked and famous, matthew and the atlas, luke sital-singh, roo panes, dry the river, stu larsen, sons of the east, foy vance, the paper kites, lucy rose, nick mulvey, dustin tebbutt, the staves, mighty oaks, william fitzsimmons, beta radio, ry x, horse feathers, johnny flynn, m. ward, deer tick, langhorne slim, damien jurado, j. tillman, fruit bats, andrew bird, joe purdy, junip, midlake, other lives, rogue wave, patrick watson, fink, vetiver, wye oak, great lake swimmers, timber timbre, kurt vile, cass mccombs

*FIG. 8.*

SYSTEM AND METHOD FOR NATURAL LANGUAGE MUSIC SEARCH

CROSS-REFERENCE TO RELATED APPLICATION

This application claims priority under 35 U.S.C. § 119(e) to co-pending U.S. Provisional Patent Application No. 62/529,293, by Debique, entitled "System and Method for Natural Language Music Search," filed Jul. 6, 2017, which is herein incorporated by reference.

BACKGROUND

Film, television and advertising often rely on music to convey elements such as mood or theme. To identify the right piece of music for a particular work, film directors, TV producers and other music professionals provide sets of requirements that describe desired music for particular scenes. Procurement can occur within fairly constrained timelines and budgets. For example, a director for a TV episode might ask to find music for a particular scene within a day, or to find music for 15 different scenes within a few months. Music or media supervisors will often use these music description requirements to draft a brief describing the kind of music the production team wants. Conventionally, in order to locate potential music candidates that fit this description, music or media supervisors might send the brief to people in their network to brainstorm possible matches. People may look up playlists to manually search for potential matches or otherwise spark ideas. Often, the process involves browsing third party music catalogs to search for potential matches.

SUMMARY

Embodiments described herein provide methods and systems for generating search results from a natural language description of music. Generally, a music description and categorization schema can be defined to provide a common language and taxonomy for searching. A dictionary can be defined that translates domain-specific natural language (e.g., English words and/or phrases describing characteristics of music) into musical features of the schema. By generating a searchable index using the schema and translating a natural language search input into the schema, a natural language search can be performed for desired music.

Generally, music catalogs can be ingested by translating song metadata into the schema to create a searchable catalog index of songs. A natural language description of music can be analyzed to generate corresponding musical features of the schema using various natural language processing techniques. For example, a raw input can be segmented into spans of text (e.g., sentences), and the spans can be assigned a valence categorization describing the sentiment of a particular span using one or more search patterns. References to music appearing in the raw input (e.g., a reference to a particular song or artist) can be identified from spans using one or more search patterns to identify search chunks, and the search chunks can be used to search for the reference in a reference database. Spans for resolved references can be updated to reference spans. Musical features for references can be looked up in the reference database. Musical features for sentences can be generated by extracting chunks of text using one or more search patterns and translating the chunks into schema features using the dictionary. As such, the spans and corresponding valence categorizations can be translated into musical features of the schema.

With the generated schema features to be searched and the searchable index in the same schema language, a search can be performed. A query string can be generated using the schema features to be searched as keywords by applying one or more query term generators from a query term profile. Alternate (e.g., wildcard) queries can be generated using relaxed criteria defined in additional query term profiles. Boost multipliers can be defined for query terms corresponding to schema categories, musical features and/or valence levels to facilitate generating ranking scores for search results. A baseline score (e.g., an all-match score) can be determined for a given query string, and the baseline score can be used to initialize search result statistics.

Various visualizations can be provided to facilitate search result review. A visualization of the translated search can be provided that includes visualizations of translated schema features, including genres and related artists, that were applied in the search. The visualization of the translated search can act as a mechanism for a user to understand and interpret the translation, and make changes, if necessary. Various visualizations of search results are possible, including visualizations of primary and/or wildcard search result sets. In some embodiments, word clouds are provided that allow a user to filter search results. For example, a word cloud can be generated with words and/or phrases corresponding to matched schema features for a selected category (e.g., a genre word cloud, a related artist word cloud, etc.) or group of categories (e.g., a word cloud for designated core schema features). The size of each feature in a word cloud corresponds to the number of search results that matched the feature. By selecting a particular feature in a word cloud, search results that matched that feature can be presented. In this manner, a user can efficiently review search results generated from a natural language description of music, and select and share candidate songs.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein:

FIG. 8 is an exemplary user interface depicting a visualization of a translated search, in accordance with embodiments described herein;

DETAILED DESCRIPTION

Overview

Figure 1:
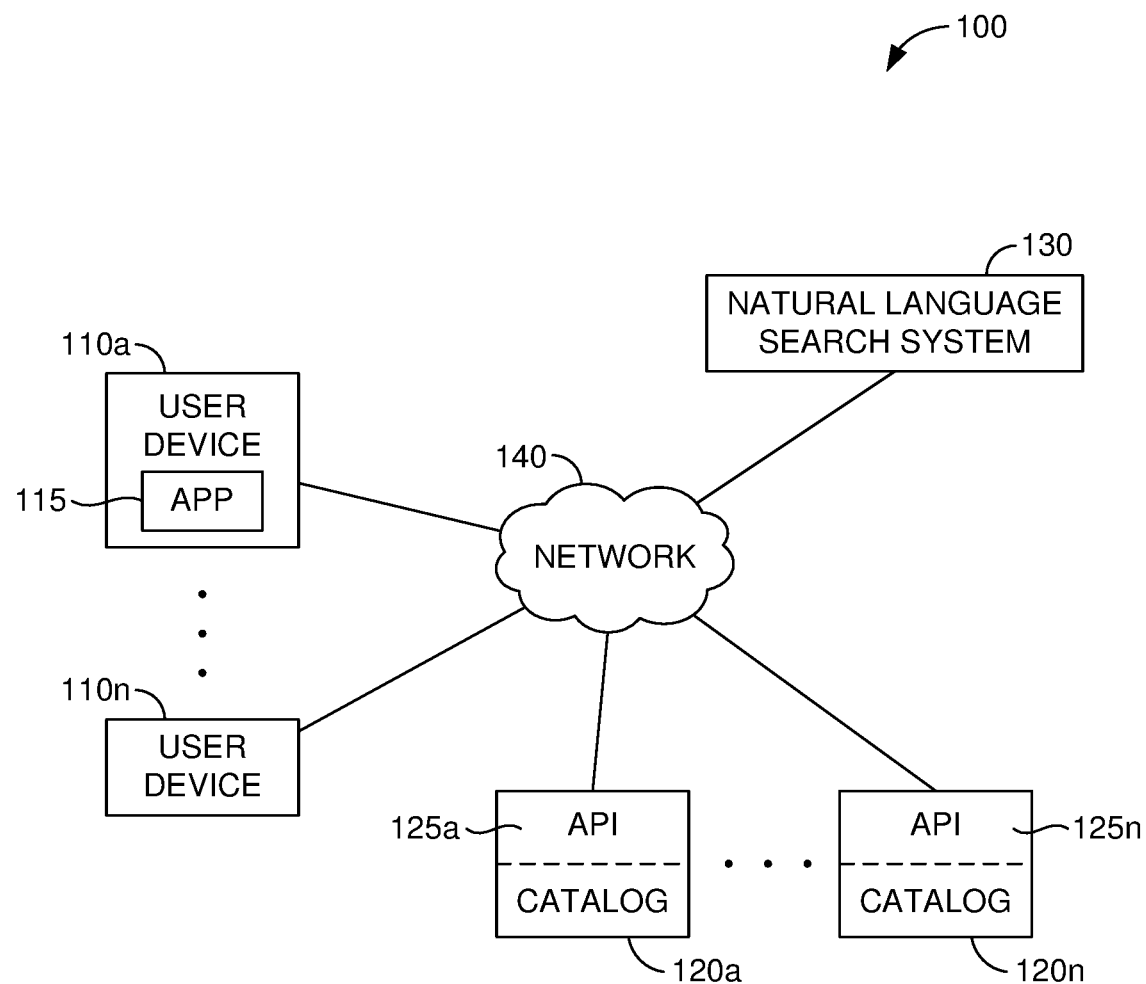
FIG. 1 is a block diagram of an exemplary computing environment, in accordance with embodiments described herein.

As described above, music or media supervisors often use music requirements to draft a brief (which may also be referred to as an offer) describing what kind of music the production team wants. Various example briefs may be found in Provisional App. No. 62/529,293 at pp. 6-8. For example, a brief might read:

"Hey guys, I'm helping a TV commercial client find music for a spot about a night drive with the whole family in spring time. The music should be warm, positive and maybe a little bit melancholic, but with a nice pace. We are open to Singer Songwriter a la Bon Iver up to Indie Folk a la The Lumineers and Of Monsters and Men. We are also open to artists like Bear's Den, and maybe that guy The Tallest Man on Earth. We do not want new americana, and nothing too mainstream. A song with a mood we love is In Every Direction by Junip. A modern take on the genre would be a plus and lyrics about hope in relationships. I've got a budget for this of 15K. Thanks!"

To identify songs that fit the description in this example, the music or media supervisors may be interested in reviewing multiple potential song candidates. Conventionally, in order to locate music that potentially fits this description, music or media supervisors might send the brief to people in their network to brainstorm ideas. People may look up playlists to search for potential matches or spark ideas. Often, the process involves browsing third party music catalogs to search for potential matches. For example, music or media supervisors may search catalogs from labels, publishers, music licensing agencies, etc. and browse results for potential matches. Such catalogs often utilize unique interfaces and search syntaxes, so the search process involves manually adapting a rich textual description into a variety of search contexts.

Conventional methods for identifying music that matches a description of musical features (e.g., from a brief) have several shortcomings because of the time and resource-intensive processes involved. For example, to identify songs within a single catalog that match a description of musical features, the description needs to be translated into the catalog's particular search syntax and entered into the catalog's search interface. Currently, this requires human effort, which can be time consuming, inefficient and susceptible to error. This process may be repeated for multiple catalogs, compounding the inefficiencies. In addition, having identified candidate songs using various catalogs, brainstorming and word of mouth, conventional methods do not provide a way to objectively rank, review, visualize or manage search results from disparate sources. As such, processes that streamline the search and review processes are integral to the efficient identification of music from a description of musical features.

Embodiments described herein provide simple and efficient methods and systems for generating search results from a natural language search request for music (like the brief above). At a high level, a music description and categorization schema can be defined to provide a common terminology (schema language) and taxonomy (schema categories) for a search architecture. Various music catalogs can be ingested into a catalog index by translating song metadata into musical features of the schema. As such, a natural language description of musical features (e.g., a brief) can be analyzed to generate corresponding musical features of the schema to be searched, and the catalog index can be searched for potential matches. More specifically, a search query can be generated from generated musical features and a corresponding search executed on the catalog index, or portions thereof (e.g., one or more ingested catalogs). Various ranking techniques can be employed, and an interface can be provided for visualizing and reviewing search results.

By way of background, natural language search processing can be improved using contextual knowledge of a particular domain, such as music. Many domains are well-suited to analysis and categorization in multiple ways such as, in the case of music, by energy, mood, rhythm, tempo, genre, etc. Furthermore, a natural language description in the context of a given domain can evoke a normalized terminology and meaning. The word "dreamy", for example, may have multiple meanings in a general sense, but in the context of a music search, it implies specific characteristics, e.g., a mellow energy, an ethereal rhythm, a reflective mood. In a general sense, contextual observations can be made within any domain. With an appropriate context, the language of a search request and a description of a potential search candidate can converge to an extent that suggests a match.

Accordingly, a search architecture can be designed around a description and categorization schema (whether pre-defined or adaptable). The description and categorization schema can be designed based on a selected domain (e.g., music, audio books, podcasts, videos, events, ticketing, real estate, etc.). For example, a music description and categorization schema can be used as a basis for articulating a request for music and/or for describing features of an individual piece of music. Generally, musical features can be grouped and/or faceted into categories (such as vibe, tempo, genre), sub-categories (e.g., rhythm, energy, and mood might be sub-categories of vibe) and instances of a given category or subcategory (e.g., Americana might be a musical feature identified as an instance in a genre category). As described in more detail below, category instances may be utilized as keywords. As described in more detail below, the particular categories, sub-categories and/or category instances that describe domain-specific content (e.g., a piece of music) can have implications for query generation and search result weighting directives.

Table 1 illustrates an exemplary music description and categorization schema. In the schema depicted in Table 1, categories can have instances that are assigned from the schema (e.g., tempo=downtempo) or free form (e.g., artist=xx). Likewise, categories and sub-categories can have instances that are partitioned (e.g., release era for a given song cannot have multiple selections) or blended (e.g., genre may have multiple selections for a given song). Some categories may have category instances that include the text of another category instance for that category (e.g., genre may include category instances for both pop and dance pop) or whose parts may have independent meaning. Accordingly, category instances longer than one word (e.g., genre=indie rock) can be delimited in various ways to support search functionality. For example, the use of a particular delimiter (e.g., a space) can facilitate tokenizing the category instance to generate multiple keywords of various units (e.g., "indie rock," "indie" and "rock") and/or matching a parent or related genre (pop) with a sub-genre (dance pop). In this manner, the use of a particular delimiter can provide structure that facilitates partial matching.

TABLE 1

| Category | Sub-category | Instances | Characteristics |
|---|---|---|---|
| Vibe | Rhythm | still | Assigned |
| | | ethereal | Blended |
| | | rhythmic | |
| | | danceable | |
| | Energy | minimal | Assigned |
| | | mellow | Blended |
| | | dynamic | |
| | | intense | |
| | Mood | emotional | Assigned |
| | | emotional_reflective | Blended |
| | | reflective | |
| | | happy | |
| | | euphoric | |
| | | quirky | |
| Production | Explicitness | clean | Assigned |
| | | explicit | Partitioned |
| | Layers | vocals_with_music | Assigned |
| | | instrumental | Partitioned |
| | | male_lead_vox | |
| | | female_lead_vox | |
| | | producer_main_artist | |
| | Recording | studio | Assigned |
| | | live | Partitioned |
| Arrangement | General | electric_or_electronic | Assigned |
| | | organic_electric_or_electronic | Blended |
| | | organic_acoustic_or_electric | |
| | | acoustic | |
| | Section | vocal_intro | Assigned |
| | Instrumentation | vocal_outtro | Blended |
| | | instrumental_intro | |
| | | instrumental_outtro | |
| | | piano_intro | |
| | | piano_outtro | |
| | | acoustic_guitar_intro | |
| | | acoustic_guitar_outtro | |
| | | electric_guitar_intro | |
| | | electric_guitar_outtro | |
| | | strings_intro | |
| | | strings_outtro | |
| | | drums_or_percussion_intro | |
| | | drums_or_percussion_outtro | |
| Shape | N/A | calm_intro_or_fade_in | Assigned |
| | | normal_intro | Blended |
| | | energetic_intro | |
| | | calm_outtro_or_fade_out | |
| | | normal_outtro | |
| | | energetic_outtro | |
| | | flat_throughout | |
| | | ascending_throughout | |
| | | descending_throughout | |
| | | multiple_crescendos | |

TABLE 1-continued

| Category | Sub-category | Instances | Characteristics |
|---|---|---|---|
| Tempo | N/A | downtempo<br>midtempo<br>uptempo | Assigned<br>Partitioned |
| Popularity | N/A | obscure<br>emerging<br>noteworthy<br>known<br>popular<br>mainstream<br>megastar | Assigned<br>Blended |
| Release | Abstract | vintage<br>retro<br>generation_x<br>contemporary<br>new<br>unreleased | Assigned<br>Partitioned |
|  | Era | 20s<br>30s<br>40s<br>50s<br>60s<br>70s<br>80s<br>90s<br>00s<br>2010_and_later | Assigned<br>Partitioned |
| Instruments | N/A | drums<br>other_percussion<br>drum_machine<br>piano<br>organ<br>acoustic_guitar<br>electric_guitar<br>strings<br>brass<br>synths | Assigned<br>Blended |
| Genre | N/A | Instances may be defined based on typically used genres and sub-genres | Assigned<br>Blended |
| Related Artists | N/A | Unbounded number of artist names | Freeform<br>Blended |
| Themes | N/A | Lyrical themes (e.g., from search requests) or lyrical indexes (e.g., from content) | Freeform<br>Blended |
| Translated Themes | N/A | Standardized lyrical themes e.g. love, good times, travel, loneliness | Assigned<br>Blended |
| Artist Names | N/A | Unbounded artist name references (e.g., from search requests) | Freeform<br>Blended |
| Song Names | N/A | Unbounded song name references (e.g., from search requests) | Freeform<br>Blended |
| Modifiers | N/A | instrumental_stem_available<br>vocal_stem_available<br>full_stems_available | Assigned<br>Blended |

A description and categorization schema can be implemented in various ways. By way of a nonlimiting example, a dictionary can be defined that translates natural language words and/or phrases to features (e.g., musical features) of the schema, and the dictionary can be stored in a database. Domain-specific dictionaries can be used to extract features from an input description. For example, a music dictionary can be used to extract musical features from a description of music (e.g., by "translating" Ngrams from the description to the schema language). In some embodiments, a reference database can be generated that relates a particular search reference (e.g., in the case of music, artists and/or songs) with corresponding features of the schema. Accordingly, in the case of music, references to specific songs or artists appearing in a description of music (e.g., "a song with a mood we love is Born in the USA") can be identified using the reference database, and musical features corresponding to that reference can be retrieved. Additionally and/or alternatively, an index of potential search targets (e.g., a searchable music catalog index) can be generated using the schema. In this manner, the index can be searched for extracted features of the schema to generate potential search results.

Various ranking techniques can be employed to rank search results for a query. For example, boost multipliers can be defined for schema categories and/or valence levels; query terms can be generated using query term generators for corresponding schema categories, schema features and/or valence levels; and ranking scores can be generated for search results based on boost multipliers for corresponding matched query terms. Additionally and/or alternatively, counts can be maintained of returned search results within schema facets (e.g., categories, sub-categories, category instances/keywords). In some embodiments, a system document can be generated that includes a representation of all schema features appearing in a catalog (e.g., all musical features appearing in the music catalog index), and a search can be executed on this "all-match document" using a modified representative version of the query (e.g. excludes negative terms, uses representative category keywords, etc.). The resulting "all-match score" can be used as a baseline maximum score used to initialize search result statistics. As such, ranking scores of search results can be converted to normalized scores (e.g., on a fixed scale such as five stars).

Various visualizations can be employed to facilitate reviewing search results. For example, a user performing a search may be presented with a visualization of musical features that were identified from a natural language input description of music. Various results visualizations can be presented, for example, including visualizations of results determined to be the most relevant (e.g., using ranking scores of search results), word clouds reflecting musical features that matched the most search results within one or more schema categories (e.g., designated core features, genre, related artists, etc.), and/or visualizations of wildcard search results that matched a relaxed query. As a user reviews search results using these visualizations, a list of selected candidate songs can be stored, displayed and shared with others.

As such, search results can be generated from a natural language description based on a description and categorization schema. Search results can be ranked using boost multipliers for corresponding matched query terms from the query string, and visualizations can be presented to facilitate review and selection of desired search results.

Exemplary Search Environment

Referring now to FIG. 1, a block diagram of exemplary environment 100 suitable for use in implementing embodiments of the present disclosure is shown. Generally, environment 100 is suitable for search engines and natural language processing, and, among other things, facilitates the generation of search results from a natural language description (e.g., of music). Environment 100 includes user devices 110a and 110n, catalogs 120a and 120n (e.g., third party music catalogs), natural language search system 130 and network 140. Generally, user devices 110a and 110n can be any kind of computing device capable of facilitating the generation of search results from a natural language description (e.g., of music). For example, in one embodiment, user device 110 can be a computing device such as computing device 2000, as described below with reference to FIG. 20. For example, user device 110 can be a personal computer (PC), a laptop computer, a workstation, a mobile computing device, a PDA, a cell phone, or the like. Catalogs 120a and 120n may contain electronic collections of music accessible to natural language search system 130. For example, electronic collections of music may reside on third party computing systems, which may be accessible, for example, via APIs 125a and 125n. The components of environment 100 may communicate with each other via a network 140, which may include, without limitation, one or more local area networks (LANs) and/or wide area networks (WANs). Such networking environments are commonplace in offices, enterprise-wide computer networks, intranets, and the Internet.

In embodiments relating to the music domain, a user can search for music by inputting a natural language description of music into an application (e.g., app 115) on a user device (e.g., user device 110a). The application may be a stand-alone application, a mobile application, a web application, or the like. Additionally and/or alternatively, the application or a portion thereof can be integrated into the operating system (e.g., as a service) or installed on a server (e.g., a remote server).

In the embodiment illustrated in FIG. 1, app 115 can receive a natural language input comprising a description (e.g., an offer or search of desired music) and transmit the description to natural language search system 130 for processing. Generally, natural language search system 130 analyzes the description to identify features (e.g., musical features), constructs and executes a search based on the identified features, and returns search results to app 115. To support searching, in some embodiments, natural language search system 130 can ingest catalogs of search target information (e.g., catalogs 120a and 120n) to construct a searchable catalog index (e.g., of songs), as described in more detail below.

Figure 2:
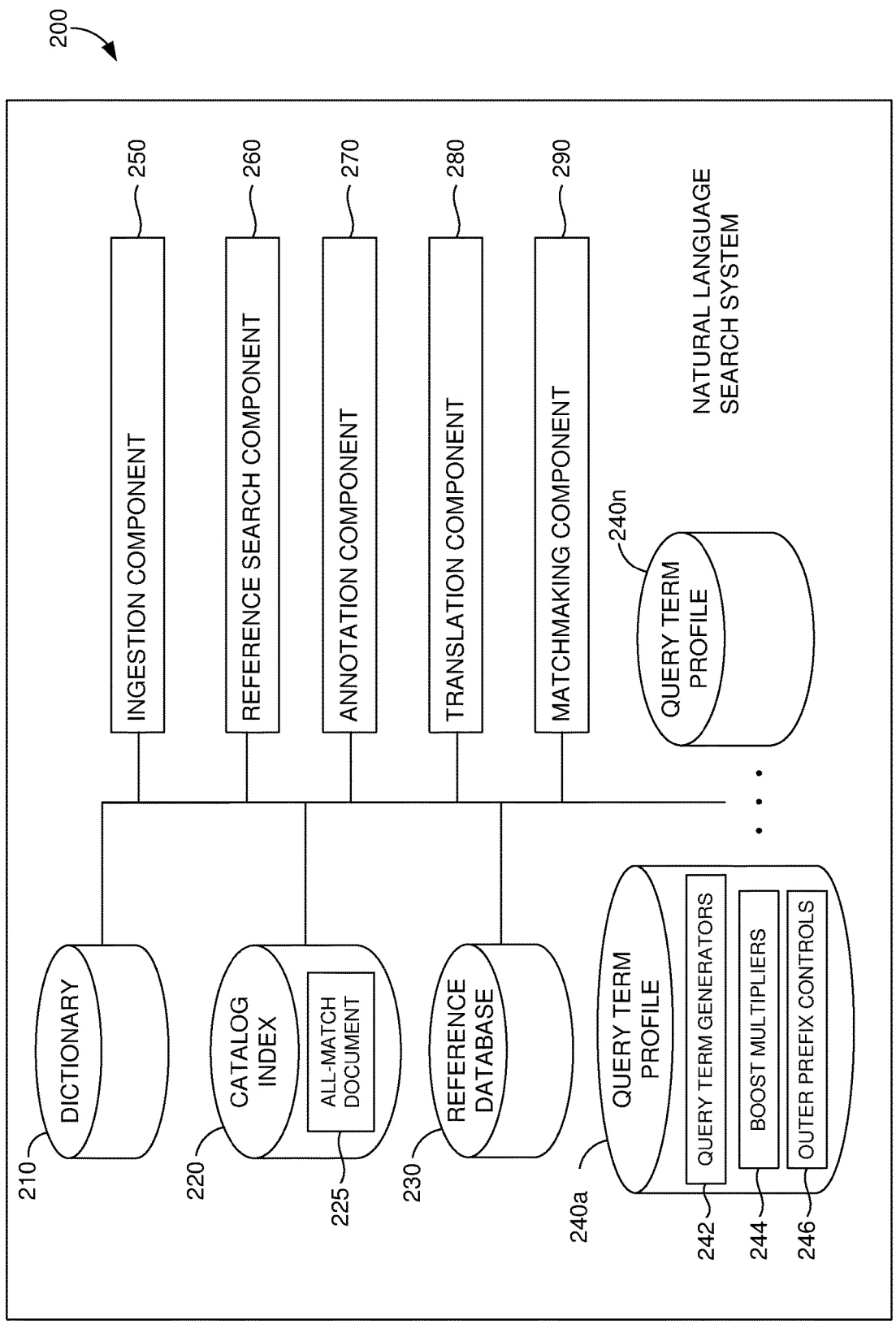
FIG. 2 is a block diagram of an exemplary natural language search system, in accordance with embodiments described herein.

Turning now to FIG. 2, FIG. 2 illustrates exemplary natural language search system 200, which may correspond to natural language search system 130 in FIG. 1. In the embodiment depicted in FIG. 2, natural language search system 200 includes dictionary 210, catalog index 220, reference database 230, query term profiles 240a through 240n, ingestion component 250, reference search component 260, annotation component 270, translation component 280 and matchmaking component 290. Natural language search system 200 may be implemented using one or more computing devices (e.g., a web server, server with one or more external databases, etc.). In embodiments where the system is implemented across multiple devices, the components of natural language search system 200 may communicate with each other via a network, which may include, without limitation, one or more local area networks (LANs) and/or wide area networks (WANs).

Natural language search system 200 decomposes the natural language search problem into feature translation and matchmaking. Feature translation is language translation from a domain-specific human language (e.g., English language search requests for music, audio books, podcasts, videos, events, ticketing, real estate, etc.) to a description and categorization schema. In embodiments relating to music searches, natural language search system 200 implements a music description and categorization schema. For example, a dictionary can be generated to translate domain-specific words and/or phrases (e.g., describing musical characteristics) to musical features in the schema, and a corresponding dictionary database file stored as dictionary 210. In some embodiments relating to music searches, dictionary 210 translates synonyms to a common musical feature, to normalize descriptions with similar meanings. An example dictionary database file for a music description and categorization schema may be found in Provisional App. No. 62/529,293 at pp. 144-168. As will be appreciated, dictionary 210 can be used for various translation purposes. For example and as explained in more detail below with respect to ingestion component 250, when ingesting third party catalogs into a music catalog index, dictionary 210 can be used to perform language translation of unstructured metadata (e.g., song descriptions) to musical features of the schema. Additionally and/or alternatively, dictionary 210 can be used to translate a natural language description of music to musical features of the schema, to facilitate generating a query string. Various other uses for dictionary 210 will be understood by those of ordinary skill in the art.

A catalog index (e.g., catalog index 220) can be generated to index search targets using one or more data structures that implement the description and categorization schema. By way of nonlimiting example, in embodiments relating to music a catalog document can be generated for each song, with the index comprising a collection of catalog documents for each song in the index. In some embodiments, songs from third party catalogs can be ingested (e.g., using ingestion component 250) via catalog plugin modules tailored to the source catalog to generate catalog documents for the index. A catalog document can include various fields for corresponding musical features of the schema. For example, fields may be designated for musical features such as identification information (e.g., song ID, third party catalog ID, artist, album, etc.); musical features corresponding to available song metadata (e.g., genre, instruments, related artists, lyrics); and musical features translated to the music description and categorization schema (e.g., vibe, production, arrangement, shape, tempo, popularity, release, instruments, etc.). Various other indexing data structures can be implemented by those of ordinary skill in the art and are contemplated within the present disclosure.

Table 2 illustrates an exemplary definition of catalog document fields. Some fields may be designated as required for a particular implementation (e.g., id, songName, artistName, releaseDate, etc.), while other fields may be designated as optional and need not be populated (e.g., albumName). Additionally and/or alternatively, one or more fields may be indexed, and one or more indexed fields may be generated to facilitate searching. For example, one field may be designated for a songName, while a second tokenized field (e.g., searchableSongName) may be generated to optimize searching, for example, by redacting terms that are unlikely to denote meaningful search content, such as music production specific terms (e.g., remastered, remix, version, featuring, deluxe edition, expanded edition, anniversary edition, LP, EP, bonus track(s), etc.); song name punctuation marks (e.g., period, ampersand, brackets, etc.) and/or digits and ordinal numbers (since they may denote production or release date references as opposed to meaningful search content). In another example, an indexed field (e.g., a field which may include freeform text) may apply tokenizer rules such as case change, alpha to numeric conversion, removing English and/or domain-specific stopwords (e.g. "and", "the", "on", "all-in", etc.), applying stemming (e.g., Porter stemming for English), synonym generation and the like. Various other tokenizer rules will be apparent to those of ordinary skill in the art and are contemplated within the present disclosure.

TABLE 2

| Field | Description |
| --- | --- |
| id | Unique identifier for the song (e.g., UUID, URI, combinations thereof, etc.) |
| catalogId | Unique identifier for the third party catalog containing the song |
| songName | Song name |
| searchableSongName | Indexed field including song name tokens |
| isrc | International Standard Recording Code |
| songPreviewUrl | URL to access the song for preview and playback when rendering search results. For example, the songPreviewUrl can be used as an HTML embed in a search result web UI or a launch target for a browser pane or tab |
| songArtUrl | URL to access artwork for the song (e.g., single or album art) |
| songDuration | Integer length of the song in milliseconds |
| artistName | Artist name |
| artistUrl | URL to artist or other site describing the artist's works |
| albumName | Name of the album, EP, single package, etc., containing the song |
| searchableAlbumName | Indexed field including album name tokens |
| albumUrl | URL to album or other site describing the work |
| releaseDate | Release date of the song |
| cSF | Core schema features - category instances from "core" designated schema categories (e.g., vibe, production, arrangement, shape, tempo, popularity, release, and instruments) |
| gF | Genre Features - category instances from genre category |
| gF_Facet | Genre Features - category instances from genre category that are not tokenized by whitespace (e.g., "dance pop" is only added to the gF field index as "dance pop") |
| iF | Instruments Features - category instances from Instruments category |
| raF | Related Artists Features - category instances from Related Artists category |
| aF | Freeform text description of the content being indexed, for example, an untranslated song description from a third party catalog. |
| tF | Themes Features - freeform text field for song lyrics, song name tokens and/or album name tokens. |

Fields may be designated to store applicable features (e.g., category instances from designated schema categories) for a given search target. Fields may be designated for features from one schema category (e.g., a genre features field) and/or multiple schema categories (e.g., a field may contain category instances from designated "core" schema categories such as vibe, production, arrangement, shape, tempo, popularity, release and/or instruments). For example, the gF field in Table 2 can be populated with genre instances for a given song. As another example, the cSF field in Table 2 can be populated with category instances for the vibe, production, arrangement, shape, tempo, popularity, release and instruments categories.

Fields may be tokenized (e.g., multiple category instances within a given field may be comma delimited) to facilitate matching individual category instances present in a corresponding catalog document. For example, a genre field may use commas to separate tokens of genre instances and may use whitespace to separate multiple parts of multi-part instances (e.g., "dance pop, etherpop, indie poptimism, pop"), and tokens and query terms may be generated in lower case form to facilitate matching. In this manner, queries on such a field can match tokens of present category instances, and queries for parent genres can also match sub-genres. In some embodiments, related genre matching can be disabled (e.g., so a search for "classical" does not match "classical crossover") by searching using a different delimiter, designating an additional non-tokenized field (e.g., gF_Facet in Table 2), or otherwise. Generally, any schema category can be used to generate a corresponding tokenized field to facilitate searching for tokens within that category (e.g., a tokenized field for Themes Features can facilitate searching for tokenized themes from song lyrics, song names, song albums, etc.). Tokenization can also facilitate performing statistical calculations for matched tokens to drive rankings and visualizations of search results (e.g., word clouds that can filter search results by schema category and/or matched token), as described in greater detail below.

One particular issue that can arise in the context of music occurs when a song is re-released without updating song content (or with only a remastering applied). In this scenario, the new "version" often has an updated release date. This can create a problem in a search regime that utilizes release date as a searchable field. This issue can be resolved, for example, by utilizing "release vibe" and/or "era" categories, and populating a field in a catalog document for the re-release with corresponding features for the original release. In the exemplary catalog document definition illustrated in Table 2, this is accomplished by assigning original release features in the cSF field.

Using the catalog document fields illustrated in Table 2, an example catalog document in JavaScript Object Notation format may look as follows. This example document is merely meant as an example. Other variations of documents, data structures and/or corresponding fields may be implemented within the present disclosure.

generated that includes a representation of all category instances (e.g., schema features) appearing in the index, and the all-match document may be used as a baseline to assist with ranking search results.

Generally, descriptions of music (like the briefs described above) often include references to specific songs or artists (e.g., "A song with a mood we love is In Every Direction by Junip.") and may include hyperlinks to the song (e.g., links to YOUTUBE® or SPOTIFY® webpages for a song). Accordingly, in some embodiments, references can be identified from a natural language description of music using natural language processing, as described in more detail below. The identification process can be facilitated by a reference database (e.g., reference database 230). For example, songs from third party catalogs can be ingested (e.g., using ingestion component 250), and reference database 230 can be populated with records of artists/songs and corresponding musical features of the music description and categorization schema. In certain embodiments, reference search component 260 searches reference database 230 for references using search chunks identified from a description of music. If reference search component 260 locates a match, reference search component 260 can retrieve an identifier for the matched artist/song and/or corresponding musical features. For example, corresponding musical features may be accessed from the reference database or from another component such as catalog index 220. As such, reference database 230 can be used to identify musical

```
{
    "id":"16e6ced0-eff1-4349-bda2-
f427aa7597e0::spotify:track:2IO7yf562c1zLzpanal1DT",
        "catalogId":"16e6ced0-eff1-4349-bda2-f427aa7597e0",
        "songName":"Gasoline",
        "searchableSongName":"Gasoline",
        "isrc":"USQY51704397",
"songPreviewUrl":"http://open.spotify.com/embed?uri=spotify:track:2IO7yf562c1
zLzpanal1DT",
        "songDuration":199593,
        "artistName":"Halsey",
"artistUrl":"http://open.spotify.com/embed?uri=spotify:artist:26VFTg2z8YR0cCu
wLzESi2",
        "albumName":"BADLANDS (Deluxe)",
        "searchableAlbumName":"BADLANDS",
        "releaseDate":"2015-08-28T07:00:00Z",
        "cSF":"danceable, dynamic, emotional_reflective, explicit,
vocals_with_music, studio, organic_electric_or_electronic, energetic_intro,
calm_outtro_or_fade_out, multiple_crescendos, midtempo, popular, mainstream,
new, 2010_and_later",
        "gF":"dance pop, etherpop, indie poptimism, pop, post-teen pop,
tropical house",
        "aF":"Halsey is the alias of New York-based pop artist Ashley
Frangipane. The New Jersey native took her moniker from a New York L train
subway stop, and her adopted city plays a large role in both the sound and
lyrics of her dark, gritty electro pop, which has been compared to acts like
Chvrches and Lorde.",
        "raF":"Halsey, Zella Day, Melanie Martinez, That Poppy, Broods, Ryn
Weaver, Lorde, Betty Who, Oh Wonder, Troye Sivan, MisterWives, MØ, Bea
Miller, Hayley Kiyoko, BØRNS, Marina and the Diamonds, The Neighbourhood,
Tove Lo, Alessia Cara, Marian Hill, Bleachers"
}
```

In this manner, a catalog index can be generated that includes one or more records describing cataloged search targets and corresponding features of the description and categorization schema. As such, the catalog index (or a portion thereof) can be the target for search queries. As described in more detail below, in some embodiments, one or more system files may be generated that include all features appearing in the catalog index. For example, an all-match document (e.g., all-match document 225) may be features for references identified from a natural language description of music. These concepts will be explained in more detail below.

With continued reference to FIG. 2, ingestion component 250 can be used to ingest catalogs (e.g., catalogs 120*a* and 120*n* in FIG. 1) and populate one or more searchable indexes and/or databases such as catalog index 220 and/or reference database 230. In the context of music, this process involves accessing song metadata from music catalogs and processing it to populate corresponding fields of the one or more searchable indexes and/or databases. As described above, such fields can include identification information (e.g., song ID, third party catalog ID, artist, album, etc.); available song metadata (e.g., genre, instruments, related artists, lyrics); and translated musical features (e.g., vibe, production, arrangement, shape, tempo, popularity, release, instruments, etc.).

Generally, music content and song metadata are primarily available via agency, label, distributor, publisher and artist music catalogs. However, there is no standardized format for song metadata among the various music catalogs. Rather, song metadata is a complex web of structured (e.g., machine generated) and unstructured (e.g., human generated) data that can be formatted in various ways and is accessible through many different infrastructures and API's. Accordingly, metadata translation can be accomplished using format conversion of structured metadata and/or language translation of unstructured metadata into musical features of the music description and categorization schema. Since catalogs may be organized in different ways, the particular metadata translation technique can depend on the source catalog being ingested. In this manner, ingestion component 250 includes tailored techniques (e.g., implemented via catalog plugin modules) for metadata translation.

With respect to translation of metadata by format conversion, relationships can be defined to convert structured metadata from a catalog to features of the schema. By way of nonlimiting example, a custom JavaScript Object Notation (JSON) importer can access formatted song metadata from a catalog owner's database and convert the metadata to the schema format. In another example, an importer for the SPOTIFY® Virtual Catalog can access SPOTIFY® song identifiers, retrieve song metadata, and convert the metadata to a format compatible with the schema. An example format conversion for translating SPOTIFY® song metadata to a music description and categorization schema may be found in Provisional App. No. 62/529,293 in Appendix A.

With respect to translation of metadata by language translation, some catalogs may include one or more metadata fields with a natural language description of music. In these instances, this unstructured metadata (e.g., the natural language description of music) can be translated to musical features of the schema (e.g., using ingestion component 250 and/or translation component 280). In some embodiments, the translation algorithm used to translate unstructured metadata (e.g., convert unstructured metadata to musical features of the schema) can be the same algorithm used to translate search requests (e.g., identify musical features from a natural language description of music), as described in more detail below. For example, in the embodiment illustrated by FIG. 2, translation component 280 may perform both translations.

In either event, whether by format conversion of structured metadata or language translation of unstructured metadata, musical features of the schema can be generated for songs/artists in music catalogs. Accordingly, ingestion component 250 can use identification information, available song metadata and/or translated musical features of the schema to populate one or more searchable indexes and/or databases, for example, like the catalog index (e.g., by generating entries such as catalog documents for songs) and the reference database (e.g., with fields for structured song metadata, most popular song metadata, etc.).

With continued reference to FIG. 2, natural language search system 200 decomposes the natural language search problem into feature translation and matchmaking. Generally, natural language search system 200 translates a description (e.g., a search request, unstructured metadata, etc.) using natural language processing to generate corresponding features in the schema (e.g., using annotation component 270 discussed below and translation component 280). In this sense, natural language search system 200 first converts an input description to a common textual form (the schema). It then finds and ranks related content via text search algorithms (e.g., using matchmaking component 290).

Figure 3:
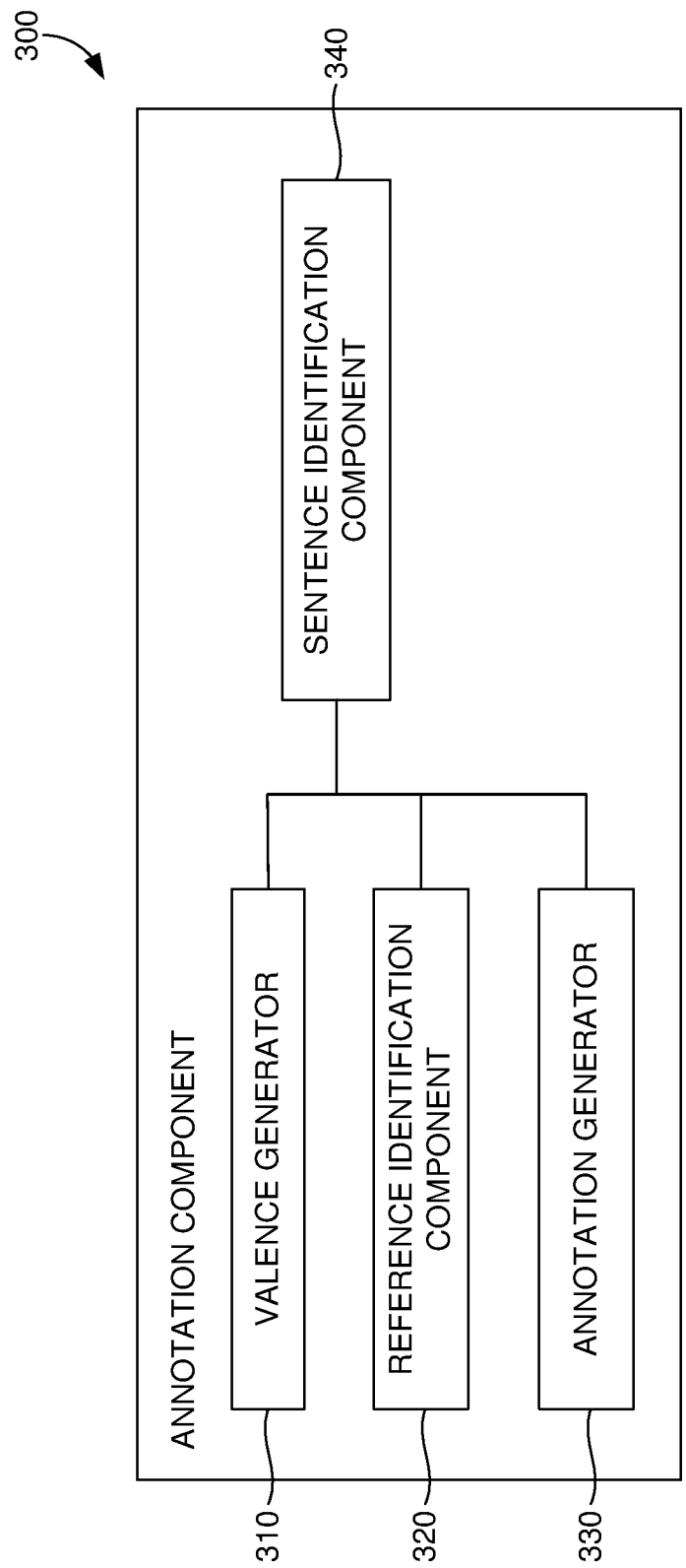
FIG. 3 is a block diagram of an exemplary annotation component, in accordance with embodiments described herein.
Figure 4:
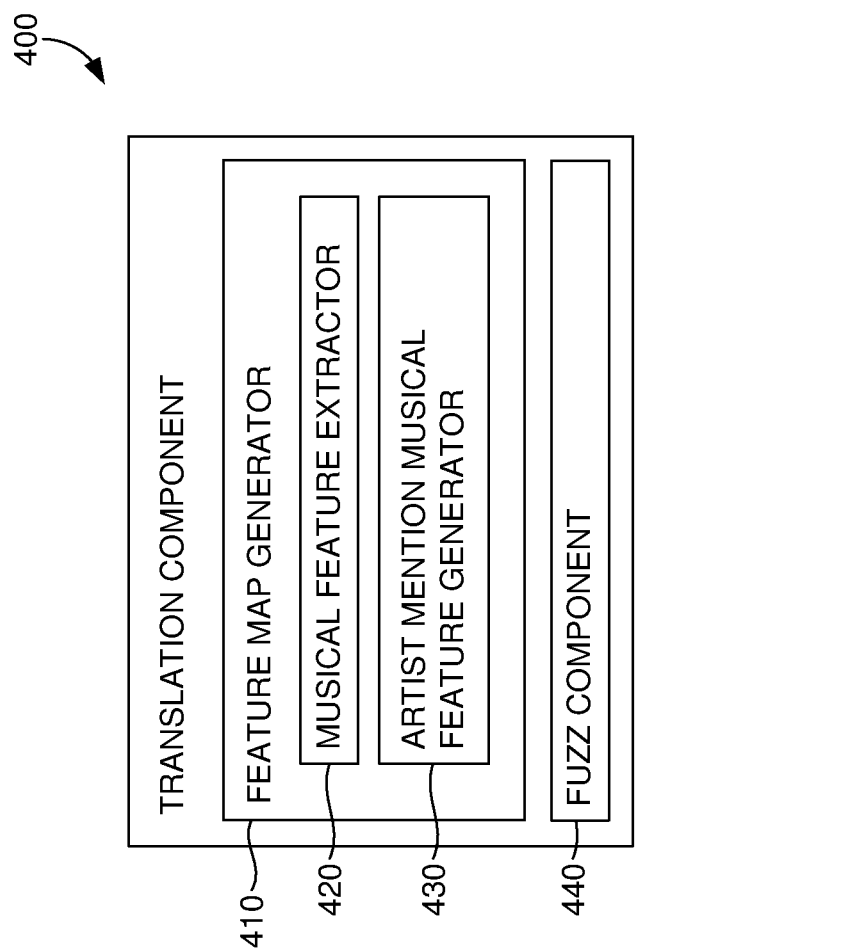
FIG. 4 is a block diagram of an exemplary translation component, in accordance with embodiments described herein.

With respect to feature translation, FIG. 3 illustrates exemplary annotation component 300 (which may correspond to annotation component 270 of FIG. 2), and FIG. 4 illustrates exemplary translation component 400 (which may correspond to translation component 280 of FIG. 2). In these embodiments, feature translation of a natural language description (e.g., natural language searches, unstructured metadata, etc.) is accomplished in two steps. First, a natural language description (the raw description) is annotated with information identified from the description (e.g., terms metadata, spans of the description and corresponding sentiments, references, hyperlinks, etc.). For example, a raw input can be segmented into units of words/characters (spans) identified by character locations in the description. In this sense, an annotated input can be generated comprising one or more documents and/or data structures that include start & stop character numbers for a given span, identification of spans that include a reference or a hyperlink, and a characterization of the sentiment of a particular span (e.g., a valence categorization). Then, the annotated input can be used to identify corresponding features in the schema.

Annotation component 300 includes valence generator 310, reference identification component 320, annotation generator 330 and sentence identification component 340. Generally, sentence identification component 340 segments a natural language input to identify spans, as would be understood by a person of ordinary skill in the art. Valence generator 310 assigns each span a valence categorization selected from a set of valence levels, reference identification component 320 identifies references (e.g., song, artist, hyperlink, etc.), and annotation generator 330 generates an annotated input comprising spans and valences.

Generally, a natural language description (such as, in the music domain, the briefs described above) can include structured inputs. Accordingly, in some embodiments, annotation component 300 can identify structured inputs as metadata spans by performing sentence detection on a raw input (e.g., using sentence identification component 340), recording resulting spans, and searching for a defined format (e.g., <header>: <data>) of defined fields (e.g., Request Title, Description, Budget, End Date, Deadline, Media, Territory, Term, etc.). Resulting metadata spans can be stored separately from spans that include song content (e.g., artist, song title, etc.), so the content spans can be analyzed separately.

In the embodiment illustrated in FIG. 3, valence generator 310 accesses a segmented natural language input and generates valence categorizations for spans (e.g., sentences) to characterize the sentiment of the spans. As used herein, valence generally refers to a characterization and/or a classification of a particular sentiment e.g. positive, neutral, or negative. Various techniques for generating a valence categorization can be implemented. By way of nonlimiting example, a set of valence levels can be defined on a scale that quantifies the degree of positivity/negativity for a particular span (e.g., a sentence). For example, a scale can be defined having any number of levels (e.g., 5, 10, 50, etc.) with one end of the scale corresponding to a positive sentiment and the opposite end corresponding to a negative sentiment. Table 3 depicts an exemplary set of valence levels that can be implemented in some embodiments.

TABLE 3

| Enum | Description |
| --- | --- |
| HighlyPositive | Used to indicate a highly positive span |
| Positive | Used to indicate a positive span |
| Neutral | Used to indicate a neutral span |
| Negative | Used to indicate a negative span |
| HighlyNegative | Used to indicate a highly negative span |

By way of nonlimiting example, a positive category (e.g., Positive) can be used to indicate a reference (e.g., song, artist, hyperlink, etc.) where the intended musical features are implied by the target content, and a higher degree positive category (e.g., HighlyPositive) can be used to indicate express preferences (e.g., musical features/keywords) where the intended musical features are stated in the natural language. For example, a span (e.g., a sentence) can be assumed to be HighlyPositive unless a negative search pattern hits, as described in more detail below. In this manner, a low degree negative category (e.g., Negative or HighlyNegative) can be used to indicate spans that matched one or more defined negative search patterns. In some embodiments, other valence categorization methodologies may be implemented, for example, using different valence levels and/or categories, different assumptions and/or different search patterns. Other variations of valence categorization methodologies are contemplated and can be implemented within the present disclosure.

Continuing with the example above, valence generator 310 can assume each span is positive (e.g., HighlyPositive), execute one or more negative search patterns, and change a valence categorization (e.g., to Negative or HighlyNegative) if a negative search pattern hits. For example, search patterns can be defined (e.g., using a regular expression, i.e., regex) to search a natural language input (e.g., a sentence from the raw input) for words and/or phrases that can indicate the beginning and/or termination of a negative sentiment. By way of nonlimiting example, a negativeValence Regular Expression Pattern can be defined, such as:

```
(?i) (nothing|not be|not a|noone like|nobody like| than | less | minus |do not
want|don't want|don't have|won't need|will not need|can't be|cannot
be|can't have|cant have|cannot have|shouldn't|without|aren't into|is not|are
not|are not into|too|not looking for|not really looking for|not
after|avoid|stay away from|nor should|but not(?!.*limited to)|yet not|yet is
not|not heard|\\bno\\b|\\bnot\\b(?!.*against))(.*)
```

Likewise, a findEarliestNegativeTerminatorIndex Terminators pattern can be defined, such as:

```
{ "would rather have", "but preferably", "but rather", "but it", " but ",
".but ", " because ", " since ", " just ", "and can ", " so anything ", "
however ", " can be ", " still need ", " more ", " are going to ", " in a
similar ", ", artist like", ", band like", ", singer like", "\n", ". ", ")",
"]", "...", "..." }
```

Accordingly, valence generator 310 can search a given span using one or more search patterns, and change a valence categorization if one or more patterns hit the span (e.g., the span contains words/phrases contained in both beginning and termination search patterns). In this manner, valence generator 310 can assign a valence categorization for spans of an input (e.g., for each sentence of a natural language description).

Reference identification component 320 generally identifies references (e.g., to a song, artist, hyperlink, etc.) from a natural language input (e.g., a span). For example, hyperlinks can be identified and corresponding references identified using the hyperlink. Additionally and/or alternatively, express references contained in natural language can be identified. In various embodiments, the identification process is facilitated by one or more indexes and/or databases (e.g., reference database 230). For example, a reference database can be searched for matches, and a resulting match (e.g., a song) can be returned with identification information and/or features for the match (e.g., from reference database).

In some embodiments, reference identification component 320 can identify references from hyperlinks appearing in a natural language input and corresponding features of the schema. For example, reference identification component 320 can run a defined URL search pattern to identify hyperlinks, determine whether a corresponding URL platform (e.g., YOUTUBE®) is supported, resolve an identified hyperlink to search terms and search a database of references using resolved search terms. If a reference is located, reference identification component 320 creates a reference span and stores the identified hyperlink.

Generally, one or more search patterns can be defined (e.g., using regex) to search a natural language input (e.g., a sentence or other span from the raw input, the full input, etc.) for words and/or phrases that can indicate a hyperlink. For example, a matchUrlInContent Regular Expression Pattern can be defined, such as:

```
(http|ftp|https)://([\\w_-]+(?:(?:\\.[\\w_-]+)+))([\\w.,@?^=%&:/~+#-
]*[\\w@?^=%&/~+#-])?
```

Accordingly, reference identification component 320 can identify a hyperlink from a given span by searching the span using one or more search patterns. A hit can indicate, for example, that the span is a hyperlink.

In some embodiments, this hyperlink can be used to look up information about the hyperlink target that can be used to search a reference database (e.g., title, artist name, etc.). For example, some platforms such as YOUTUBE® provide an API that allows third parties to access information about content hosted on the YOUTUBE® platform. As such, reference identification component 320 can determine whether an identified hyperlink points to a supported platform (e.g., by using a search pattern to identify supported platforms), and if so, resolve the hyperlink to search terms (e.g., using the platform's API). For example, for YOUTUBE® hyperlinks, reference identification component 320 can use the YOUTUBE® API to retrieve the name of the target video (usually containing some form of the artist and song name) and generate corresponding search terms (e.g., the entire video name, a segment of the video name, with or without redactions and/or modifications, etc.), as would be understood by a person of ordinary skill in the art. Additionally and/or alternatively, a target webpage can be analyzed for relevant search terms. As such, reference identification component 320 can resolve an identified hyperlink to one or more search terms for searching a reference database.

Generally, a reference database (e.g., reference database 230) can be searched for an identified search term (e.g., a search chunk identified from a span from a natural language input, a retrieved video title, etc.). For example, reference identification component 320 can call reference search component 260 to search reference database 230. Various natural language processing techniques can be implemented to facilitate searching. By way of nonlimiting example, redactions can be applied to incompatible characters and production terms (e.g., instrumental version, version xxx, etc.). In a preferred embodiment, a resulting redacted search term can be stored for comparison with multiple results. Additionally and/or alternatively, redactions and/or modifications can be applied to defined strings/terms (e.g., removing "'s"; removing "by"; changing "theme song" to "theme"; etc.) to improve the likelihood that a search hit occurs. In this manner, reference search component 260 can refine search terms and search reference database 230 for the refined search terms. For example, reference search component 260 may search a song field of reference database 230. If there are no results, text of the search term appearing after selected indicators such as "-" and/or "(" can be removed and the search rerun. If there are no results, a new search chunk can be allocated with an updated position based on an open quote, if available (e.g., in case the text that follows an open quote is the beginning of a song search term) and the search rerun. If any of these searches results in multiple matches, the matches can be compared with the search term stored before applying some or all redactions and/or modifications to identify the best match. If a reference is located, reference identification component 320 can create a corresponding reference span (e.g., including a corresponding valence categorization such as Positive) and store the identified hyperlink. Otherwise, a reference can be identified as unresolved. Other variations of search methodologies can be implemented within the scope of the present disclosure.

Additionally and/or alternatively, reference identification component 320 can identify references (e.g., song or artist) appearing in the text of a natural language input (e.g., a span). For example, one or more defined search patterns can be applied to spans (preferably excluding metadata spans) to identify search chunks that can be used as search terms to search a reference database (e.g., reference database 230).

For example, one or more search patterns can be defined (e.g., using regex) to search a given span for words and/or phrases that can indicate that a reference may follow. By way of nonlimiting example, a References Match Detector Regular Expression Pattern can be defined, such as:

---

(?i)((example(.*)(:|is|be)|examples(.*)(:|are|be)|\\brefs\\b(.*)(:|are|be)|\\bref(.*)(\\.|:|is)|resemble(.*)(:|is|are|be|)|reference(.*)(:|is|are|be)|references(.*)(:|are|be)|(\\bmood\\b|\\bmoods\\b)(?!.*(is|are|(sh|w|c)ould|will))|(\\bsong\\b|\\bsongs\\b|\\bmusic\\b|\\btrack\\b|\\bguitar\\b|\\bdrums\\b|\\binstrumental\\b|\\binstrumentals\\b)(.*)(like|like is|like are|liking|love|love is|love are|such as|similar to|a|a la|similar (feel|vein) to|:)|( song is | songs are | especially the song | especially the songs | including the song | including the songs | reference song | sound:| should sound (.*) like:)|((like|love|adore)( the| a| this| that| those| these)( song| songs| track| music| tracks))|(syncfloor:youtubelinktranslation:)|something like(:| )|maybe like(:| )|(replacing:|replace:|replace |replacing|replacement for:|replacement for|replacements for:|replacements for|to replace the song|to replace))\\s*|\\n*)

---

Accordingly, reference identification component 320 can apply one or more search patterns to identify spans that may contain references.

Generally, spans (e.g., spans matching the References Match Detector search pattern) are analyzed to identify one or more search chunks that can be used as search terms to search a reference database for a corresponding reference. Spans can be analyzed as a whole and/or in segments. For example, because natural language inputs can include lists of references appearing across multiple lines of text, in some embodiments, an identified span (e.g., based on one or more search patterns) can be partitioned by carriage return to separate out multiple lines. Lines can be skipped, for example, if a line includes metadata without music content (e.g., deadline, budget) or if the line is empty. Remaining lines can be analyzed to identify a search chunk from the line. In some embodiments (e.g., in the event that a given span does not include a carriage return), the entire span can be analyzed to identify a search chunk from the span.

In some embodiments, one or more markers can be defined to indicate a confidence that a reference will follow. For example, high confidence reference markers can be defined to indicate a high likelihood that a reference and/or reference search terms will appear after a marker. By way of nonlimiting example, a highConfidenceMarkers pattern can be defined, such as:

---

{
    "syncfloor:youtubelinktranslation:",
    "song like",
    "Song like",
    "references:",
    "reference:",
    "References:",
    "Reference:",
    "references :",
    "reference :",
    "References :",
    "Reference :",
    "REFERENCE:",
    "REFERENCE TRACK:",
    "REFERENCE :",
    "REFS:",
    "REFS :",
    "REF:",
    "REF :",
    "examples:",
    "example:",
    "Examples:",
    "Example:",
    "examples :",
    "example :",
    "Examples :",
    "Example :",
    "EXAMPLE:",
    "EXAMPLE :",
    "EXAMPLES:",
    "EXAMPLES :",
    "sound:",
    "reference is:",
    "reference is ",
    "reference are ",
    "references is ",
    "references are ",
    "references are:",
    "reference song ",
    "example is ",
    "example are ",
    "examples is ",
    "examples are ",
    " looking for is ",
    " likes:",
    " like:",
    " are:",
    " is:",
    " be:",
    " take:",
    " below:",
    " after:",
    " below -",
    " genre:",
    " for:",
    " song:",

```
" songs:",
" SONG:",
" SONGS:",
" track:",
" tracks:",
" TRACK:",
" TRACKS:",
" ref. ",
" resembles ",
" resemble ",
"replace the song ",
"replace ",
"replacements for ",
"replacement for ",
"replacing: ",
"replace: ",
"Replacements for ",
"Replacement for ",
"Replacing: ",
"Replacing ",
"replacements ",
"replacement ",
" such as the reference song ",
" such as the reference ",
" such as the song ",
" such as ",
" especially the song ",
" especially the songs ",
" including the song ",
" including the songs ",
" liking is ",
" liking are ",
" liking ",
" likes is ",
" likes are",
" like is ",
" like are ",
"like the song ",
"love the song ",
"love with the song ",
"adore the song ",
"like that song ",
"love that song ",
"adore that song ",
"like this song ",
"love this song ",
"adore this song ",
"like a song ",
"love a song ",
" love with a song ",
"adore a song ",
"like the music ",
"love the music ",
"love with the music ",
"adore the music ",
"like that music ",
"love that music ",
"like the songs ",
"love the songs ",
" love with the songs ",
"adore the songs ",
"like these songs ",
"love these songs ",
"adore these songs ",
"like the track ",
"love the track ",
" love with the track ",
"adore the track ",
"like that track ",
"love that track ",
"adore that track ",
"like this track ",
"love this track ",
"adore this track ",
"like a track ",
"love a track ",
" love with a track ",
"adore a track ",
"like the tracks ",
```

```
"love the tracks ",
" love with the tracks ",
"adore the tracks ",
"like these tracks ",
"love these tracks ",
"adore these tracks ",
" wants are ",
" wants is ",
" want are ",
" want is ",
" like very much is ",
" likes very much is ",
" a la ",
" ala ",
" similar to ",
"Music like ",
"music like ",
"Instrumental like ",
"instrumental like ",
"Instrumentals like ",
"instrumentals like ",
" similar feel to ",
" similar vein to ",
"something like",
"Something like",
"maybe like",
"Maybe like",
"guitar like ",
"Guitar like ",
"drums like ",
"Drums like "
}
```

Accordingly, reference identification component 320 can identify the earliest occurrence of a high confidence marker in a given span or line, for example, by applying one or more corresponding search patterns. If one of the markers is found in a given span or line, the span or line can be broken at the earliest marker, and the text that follows can be identified as the search chunk. In the case of a span partitioned into lines (e.g., in the event the span includes a list of references), an identified marker is preferably stored for future reference while processing the remaining lines.

Additionally and/or alternatively, low confidence reference markers (e.g., is, like, etc.) can be defined that indicate a relatively lower confidence that the subsequent characters will be a reference and/or reference search terms. Since such terms may be relatively common, one way to increase the confidence is to define one or more triggers (e.g., example, mood, song) and only extract a search term when a trigger appears and a corresponding marker (preferably the earliest marker in a given span or line) appears after the trigger. For example, a lowConfidenceMarkerTriggers pattern can be defined, such as:

```
{
    "reference",
    "example",
    "mood",
    "song"
}
```

Likewise, a lowConfidenceMarkers pattern can be defined, such as:

```
{
    " like ",
    " of is ",
    " for is ",
```

-continued

```
    " is ",
    " are ",
    " be "
}
```

Accordingly, reference identification component 320 can identify a trigger and a subsequent marker (e.g., the earliest low confidence marker appearing after the trigger), for example, by applying one or more corresponding search patterns. If a trigger and marker are found in a given span or line, the span or line can be broken at the marker, and the text that follows can be identified as the search chunk. In the case of a span partitioned into lines (e.g., in the event the span includes a list of references), an identified marker is preferably stored for future reference while processing the remaining lines.

In some embodiments, identified search chunks can be evaluated to determine whether a search chunk includes text suggesting a false positive, in which case the search chunk can be skipped. For example, a trigger and marker combination such as "songs . . . such as . . . " may have matched an unintended phrase such as "songs which are made with instruments such as guitar . . . " To address such false positives, a References Skip Detector Regular Expression Pattern can be defined, such as:

```
(?i)(made with|made out of|going to be played|song combined with|song
is
being|song underlining|already well-known|unreleased|mid-tempo|or
something like that|composed with|composed using|composed of|described
as|edited in|likes about this|song needs to appeal|song must appeal|lyrical
themes|about love|song about|songs about|use of sounds|used for
sampling|mix of instruments|all-in|local
cable|specifications:|specs:|note:|weird instrumentation|from artists|
etc|references so)
```

Accordingly, search chunks with text that match a defined skip search pattern can be identified as false positives, and the search chunks skipped.

In this manner, one or more search patterns can be used to identify one or more search chunks from a given span. In some embodiments, a reference database is searched for an identified search chunk at the time the search chunk is identified. In this sense, markers are preferably searched in a defined priority order to increase the likelihood of locating a meaningful search chunk faster and with reduced processing. In other embodiments, any number of search chunks (e.g., all of them) can be identified before searching any of them.

As described above, a reference database (e.g., reference database 230) can be searched using an identified search chunk as a search term. In some embodiments, reference identification component 320 can call reference search component 260 to search reference database 230, as described above. If the search does not produce any results, one or more subsequent search chunks can be identified, and a corresponding search performed. For example, multiple search chunks may be identified from a given span based on matching multiple markers and/or marker/trigger combinations. Additionally and/or alternatively, one or more search chunks can be identified using one or more delimiters (e.g., commas, "and"s, "or"s, etc.). For example, if the number of delimiters appearing in a given span, line and/or search chunk is greater than two, this may indicate the presence of multiple songs separated by a delimiter. Accordingly, one or more search chunks can be allocated by splitting the span, line and/or search chunk by delimiter, and performing corresponding searches (e.g., searching reference database 230 by song). If a reference is located, reference identification component 320 can create a corresponding reference span (e.g., including a corresponding valence categorization) and store the identified reference. For example, if a search chunk was identified from a span that was previously categorized as positive, the reference span can be categorized as positive (e.g., Positive). Likewise, if a search chunk was identified from a span that was previously categorized as negative, the reference span can be categorized as negative (e.g., Negative). If a reference is not located, a reference span can be identified as unresolved. In this manner, spans and/or lines (e.g., each line of each span, excluding metadata spans) can be searched for references. Other variations of search methodologies can be implemented within the scope of the present disclosure.

In some instances, an identified reference span may encompass multiple spans that sentence identification component 340 had identified and valence generator 310 had assigned a valence categorization. Accordingly, in some embodiments, reference identification component 320 removes or redacts spans that occur within an identified reference span.

In this manner, annotation component 300 analyzes a raw input, segments the input into spans, identifies references, and assigns valence categorizations. An annotated input can be generated (e.g., by annotation generator 330) comprising one or more documents and/or data structures. For example, an annotated input can be implemented using a tagged text span data structure to describe a given span. Table 4 describes an example tagged text span data structure with example fields. For example, fields can be designated for start & stop character numbers for a given span, identification of spans that include a reference or a hyperlink, and a characterization of the sentiment of a particular span (e.g., a valence categorization). Other variations of data structures and/or fields can be implemented within the present disclosure.

TABLE 4

| Field | Type | Description |
|---|---|---|
| startChar | int | Zero based offset of first character in the raw input associated with this span |
| endChar | int | Zero based offset of last character in the raw input associated with this span |
| valence | Valence | Categorization of the sentiment of a particular span. Values can correspond to defined valence levels. |

TABLE 4-continued

| Field | Type | Description |
|---|---|---|
| referenceType | ReferenceType | Can be set (e.g., with values for "artist" and "song") or not set. If set, this span is a reference span for a corresponding Reference Type (e.g., artist, song, etc.). If not set, then this span is a statement from the raw input. |
| hyperlink | String | Can be set with a URI identified from this span. |
| Identifier | String | An additional identifier for the content target of the URI if available e.g. ISRC for a song |

As such, annotation generator 330 can generate an annotated input using a tagged text span data structure to describe spans, references, and valence categorizations for a raw input. In some embodiments, annotation generator 330 generates one or more documents compiling the raw input, corresponding spans, span information, portions thereof and/or combinations thereof. Terms metadata can be separated from the raw input, e.g., except where the terms metadata includes content (e.g., title or description) that comprises the entire raw input. By way of nonlimiting example, annotation generator 330 can generate a document (e.g., in JSON format), such as the following annotated input. This example document is merely meant as an example. Other variations of documents, data structures and/or corresponding fields may be implemented within the present disclosure.

```
{
    "content": {
        "language": "en",
        "value": "Organic and Folky rhythmic song for trade show video\nFor a
trade show video (self promotion as the brand is a trade show) a client is
looking for an organic and folky song that has a nice driving rhythm. We
prefer scarce vocals or instrumentals. The song shall convey a good drive and
be positive without being kitschy. The film will be around 2:30 mins long.
References are:\nMatthew & The Atlas - I will remain\nRadical Face - Wrapped
in Piano Strings\nLicense:\nMedia:\tInternet, Trade show/
Events\nTerritory:\tWorld\nTerm:\t72 months\nPayout:\tEUR 4,000 (all-
in)\nDeadline:\t28.04.2017 13:00 CET"
    },
    "offerid": "66153b39-c2d4-4a33-8454-4d7be1c78c43",
    "contenthash": "egWqAPR+R3hHiCbzfEaoMQ==",
    "originatinghost": "Kirts-MacBook-Pro.local",
    "metadata": {
        "spans": [
            {
                "class": "text",
                "locateby": "position",
                "start": 452,
                "end": 460
            },
            {
                "class": "text",
                "locateby": "position",
                "start": 461,
                "end": 496
            },
            {
                "class": "text",
                "locateby": "position",
                "start": 497,
                "end": 513
            },
            {
                "class": "text",
                "locateby": "position",
                "start": 514,
                "end": 529
            },
            {
                "class": "text",
                "locateby": "position",
                "start": 530,
                "end": 556
            },
            {
                "class": "text",
                "locateby": "position",
                "start": 557,
                "end": 586
            }
```

```
        ],
        "class": "emailbodyheaders",
        "firstsentence": "Organic and Folky rhythmic song for trade show video"
    },
    "annotations": {
        "spans": [
            {
                "class": "statement",
                "valence": "HighlyPositive",
                "locateby": "position",
                "start": 0,
                "end": 296
            },
            {
                "class": "statement",
                "valence": "Negative",
                "locateby": "position",
                "start": 297,
                "end": 318
            },
            {
                "class": "statement",
                "valence": "HighlyPositive",
                "locateby": "position",
                "start": 319,
                "end": 375
            },
            {
                "class": "reference",
                "valence": "Positive",
                "start": 376,
                "end": 410,
                "locateby": "uri",
                "uri": "spotify:track:52VPecMGJQOxyWWWgnUvsI",
                "isrc": "GB6TW1000022",
                "embed": "http://open.spotify.com/embed?uri=spotify:track:52VPecMGJQOxyWWWgnUvsI"
            },
            {
                "class": "statement",
                "valence": "HighlyPositive",
                "locateby": "position",
                "start": 411,
                "end": 411
            },
            {
                "class": "reference",
                "valence": "Positive",
                "start": 412,
                "end": 450,
                "locateby": "uri",
                "uri": "spotify:track:0r7EiYTNNP0WCzcaefN6TZ",
                "isrc": "DEX260606906",
                "embed": "http://open.spotify.com/embed?uri=spotify:track:0r7EiYTNNP0WCzcaefN6TZ"
            },
            {
                "class": "statement",
                "valence": "HighlyPositive",
                "locateby": "position",
                "start": 451,
                "end": 451
            }
        ]
    }
}
```

Turning now to FIG. 4, FIG. 4 illustrates exemplary translation component 400 (which may correspond to translation component 280 of FIG. 2). In some embodiments, translation component 400 parses structured data from the content of an annotated input to generate build terms (e.g., deadline, budget, catalogs to include/exclude, media, territory, term, etc.). Generally, translation component 400 utilizes the annotated input to generate features in the schema corresponding to the annotated input. In the embodiment illustrated by FIG. 4, translation component 400 includes feature map generator 410 and fuzz component 440. Feature map generator 410 generates a feature map associating valence categorizations of the annotated input with corresponding identified schema features. Fuzz component 440 applies fuzzing to the identified schema features to reduce the risk of conflicts and increase the relevance of search results. In this manner, translation component 400 translates an annotated input into corresponding schema features. The generated features can then be used to generate a query string.

Generally, feature map generator 410 processes an annotated input by parsing it into its constituent spans, generating corresponding schema features for each span, and compiling the generated features into one or more data structures such as a feature map. For spans that indicate resolved references (e.g., songs), feature map generator 410 looks up corresponding schema features (e.g., categories & category instances) from one or more indexes and/or databases (e.g., reference database 230). For spans that indicate statements from the raw input, feature map generator 410 identifies schema features for the spans using natural language processing. Feature map generator 410 can accomplish this using musical feature extractor 420 and artist mention musical feature generator 430.

Musical feature extractor 420 extracts mentions of musical characteristics in a given span and translates those musical characteristics to musical features of the schema. For example, musical feature extractor 420 can generate forward Ngrams (e.g., min 2, max 8) from a given span, and lookup the Ngrams in a dictionary that translates natural language to musical features of the schema (e.g., dictionary 210). For any matched Ngram, corresponding translated features can be stored. For example, translated features and corresponding valence categorizations can be stored in a feature map. Tokens can be utilized to keep track of which words in a span have been translated. For example, a token can be applied to each word in a span, and the tokens can be enabled by default. If an Ngram is matched, the tokens for each word in the Ngram can be disabled. For any remaining enabled tokens, corresponding individual words can be looked up in the dictionary to identify corresponding features. For any match, the corresponding musical feature and valence categorization are stored in the feature map (e.g., organized by valence level and/or schema category). In this manner, a feature map can be populated with translated features corresponding to musical characteristics in a given span.

In some embodiments, artist mention musical feature generator 430 uses remaining enabled tokens to search a reference database for artist mentions, retrieve corresponding musical features of the schema, and store the features in the feature map. As a preliminary matter, if a span being processed matched a defined reference search pattern (e.g., as described above), the span can be skipped (for example, because the reference database was already searched for matches from the span). For a given span to be processed, artist mention musical feature generator 430 can run a defined artist mention search pattern (e.g., on the full span, or a portion thereof) to identify the location of content in the span to process. For example, if a search pattern identifies an artist mention marker in a span, the span can be broken at the marker, and the text that follows can be used for processing. As such, artist mention musical feature generator 430 can perform one or more delimited searches to search for artist mentions in the identified text (e.g., after removing disabled tokens).

For example, artist mention musical feature generator 430 can perform a comma delimited search by removing disabled tokens (excluding commas), splitting the remaining text at any comma to generate segments of a comma delimited sentence, and searching a reference database for artists that match a segment of the comma delimited sentence. If a search hits, corresponding musical features for that artist can be retrieved (e.g., from the reference database), the features can be stored (e.g., in a feature map organized by valence categorizations and/or schema category), and the tokens corresponding to the matched artist can be disabled to remove the matched artist from the comma delimited sentence.

Additionally and/or alternatively, artist mention musical feature generator 430 can perform a space delimited search, for example, by reconstituting the remaining comma delimited sentence into a space delimited sentence, generating forward Ngrams (e.g., min 1, max 4), and searching the reference database for artists matching the Ngrams. If a search hits, corresponding musical features for that artist can be retrieved (e.g., from the reference database), the features can be stored (e.g., in a feature map organized by valence categorizations and/or schema categories), and the tokens corresponding to the matched artist can be disabled to remove the matched artist from the space delimited sentence.

Accordingly, feature map generator 410 can identify musical features from a given span, and store the identified musical features in one or more data structures such as a feature map. Each of the spans from an annotated input can be processed in this manner to generate a feature map that includes translated music features from a natural language description of music. Preferably, duplicate features are removed.

Fuzz component 440 applies fuzzing to the identified musical features (e.g., the feature map) to reduce the risk of conflicts and to increase the relevance of search results based on the feature map. For example, fuzz component 440 can include an intra valence fuzz component, an inter valence fuzz component, an inter valence negation correction component and/or an inter valence copy component.

The intra valence fuzz component identifies related features in the schema that may describe overlapping content. For example, in a category such as vibe, features such as rhythmic and danceable may be considered interchangeable in some respects. When either feature is present, it may be preferable to search for results matching either feature. Accordingly, if one of a defined group of similar features is included in a given valence level in the feature map, the intra valence fuzz component includes the other feature(s) in the group, as well.

The inter valence fuzz component addresses feature categories that can create significant false negatives. For example, a raw input may have requested uptempo music, but also included references that were midtempo and/or downtempo. If an input has such a conflict, the inter valence fuzz component can reduce the resulting impact by "fuzzing" the conflicting features across valence levels. More specifically, a conflicting feature from one valence level can be added to the valence level with the other conflicting feature. For example, the inter valence fuzz component can identify defined conflicts between a positive musical feature for a reference (e.g., midtempo and downtempo in the Positive valence) and a positive musical feature derived from a sentence (e.g., uptempo in the HighlyPositive valence), and resolve conflicts by adding the positive musical feature for the reference to the valence level with the positive musical features derived from the sentence (e.g., by placing the midtempo and downtempo features in the HighlyPositive valence).

The inter valence negation correction component addresses situations where the feature map includes a given feature in both positive and negative valences. For example, a feature map that includes a vocals_with_music feature from the production category in both a positive category (e.g., because a reference included vocals) and a negative category (e.g., because a negative sentiment was erroneously implied based on natural language processing). For some partitioned categories, this type of conflict can prevent any search results from returning. Accordingly, the inter valence negation correction component can identify defined conflicts between a positive musical feature for a reference (e.g., in the Positive valence) and a negative musical feature derived from a sentence (e.g., in the HighlyNegative valence), and resolve identified conflicts by removing the negative musical feature from one of the valence levels (e.g., removing the feature derived from the sentence).

The inter valence copy component addresses defined situations where a feature derived from a sentence (e.g., in the HighlyPositive valence) is incompatible with a feature for a reference (e.g., in the Positive valence). For example, for some categories such as genre, it may be possible to imply genres from references that are incompatible with genres explicitly included in a description. Accordingly, the inter valence copy component can identify at least one defined category for copying, and copy positive musical features for that category that were extracted from a sentence (e.g., in the HighlyPositive Valence) into the valence level for the musical features implied from references (e.g., in the Positive valence), and/or vice versa.

In this manner, translation component 400 can generate a set of translated features from an annotated input. In some embodiments, translation component 400 generates one or more documents compiling the raw input, corresponding spans, span information, structured data (e.g., build terms), valence-ordered feature map, portions thereof and/or combinations thereof. By way of nonlimiting example, translation component 400 can generate a document (e.g., in JSON format), such as the following. This example document is merely meant as an example. Other variations of documents, data structures and/or corresponding fields may be implemented within the present disclosure.

```
{
  "content": {
    "language": "en",
    "value": "Organic and Folky rhythmic song for trade show video\nFor a
trade show video (self promotion as the brand is a trade show) a client is
looking for an organic and folky song that has a nice driving rhythm. We
prefer scarce vocals or instrumentals. The song shall convey a good drive and
be positive without being kitschy. The film will be around 2:30 mins long.
References are:\nMatthew & The Atlas - I will remain\nRadical Face - Wrapped
in Piano Strings\nLicense:\nMedia:\tInternet, Trade show/
Events\nTerritory:\tWorld\nTerm:\t72 months\nPayout:\tEUR 4,000 (all-
in)\nDeadline:\t28.04.2017 13:00 CET"
  },
  "offerid": "66153b39-c2d4-4a33-8454-4d7be1c78c43",
  "contenthash": "egWqAPR+R3hHiCbzfEaoMQ==",
  "originatinghost": "Kirts-MacBook-Pro.local",
  "metadata": {
    "spans": [
      {
        "class": "text",
        "locateby": "position",
        "start": 452,
        "end": 460
      },
      {
        "class": "text",
        "locateby": "position",
        "start": 461,
        "end": 496
      },
      {
        "class": "text",
        "locateby": "position",
        "start": 497,
        "end": 513
      },
      {
        "class": "text",
        "locateby": "position",
        "start": 514,
        "end": 529
      },
      {
        "class": "text",
        "locateby": "position",
        "start": 530,
        "end": 556
      },
      {
        "class": "text",
        "locateby": "position",
        "start": 557,
        "end": 586
      }
    ],
    "class": "emailbodyheaders",
    "firstsentence": "Organic and Folky rhythmic song for trade show video"
  },
```

```
      "annotations": {
        "spans": [
          {
            "class": "statement",
            "valence": "HighlyPositive",
            "locateby": "position",
            "start": 0,
            "end": 296
          },
          {
            "class": "statement",
            "valence": "Negative",
            "locateby": "position",
            "start": 297,
            "end": 318
          },
          {
            "class": "statement",
            "valence": "HighlyPositive",
            "locateby": "position",
            "start": 319,
            "end": 375
          },
          {
            "class": "reference",
            "valence": "Positive",
            "start": 376,
            "end": 410,
            "locateby": "uri",
            "uri": "spotify:track:52VPecMGJQOxyWWWgnUvsI",
            "isrc": "GB6TW1000022",
            "embed":
"http://open.spotify.com/embed?uri=spotify:track:52VPecMGJQOxyWWWgnUvsI"
          },
          {
            "class": "statement",
            "valence": "HighlyPositive",
            "locateby": "position",
            "start": 411,
            "end": 411
          },
          {
            "class": "reference",
            "valence": "Positive",
            "start": 412,
            "end": 450,
            "locateby": "uri",
            "uri": "spotify:track:0r7EiYTNNP0WCzcaefN6TZ",
            "isrc": "DEX260606906",
            "embed":
"http://open.spotify.com/embed?uri=spotify:track:0r7EiYTNNP0WCzcaefN6TZ"
          },
          {
            "class": "statement",
            "valence": "HighlyPositive",
            "locateby": "position",
            "start": 451,
            "end": 451
          }
        ]
      },
      "analysis": {
        "metadata": {
          "Format": "SyncFloorHeaders",
          "Title": "Organic and Folky rhythmic song for trade show video",
          "Deadline": "Fri, 28 Apr 2017 05:00:00 -0700",
          "BudgetLow": "4000",
          "BudgetHigh": "4000",
          "BudgetCurrency": "EUR",
          "ReleaseDateRange": [ ],
          "CatalogInclude": [ ],
          "CatalogExclude": [ ],
          "SearchResultMinBar": "1.0",
          "Media": [
            "Internet, Trade show/ Events"
          ],
          "Territory": [
            "World"
          ],
```

```
            "Term": [
                "72 months"
            ],
            "Segment": [ ]
        },
        "featuremap": {
            "valences": [
                {
                    "valence": "HighlyPositive",
                    "features": [
                        {
                            "featureType": "Vibe",
                            "featureValues": "rhythmic, danceable, happy"
                        },
                        {
                            "featureType": "Production",
                            "featureValues": "vocals_with_music, instrumental"
                        },
                        {
                            "featureType": "Arrangement",
                            "featureValues": "organic_acoustic_or_electric, acoustic"
                        },
                        {
                            "featureType": "Tempo",
                            "featureValues": "midtempo, uptempo"
                        },
                        {
                            "featureType": "Genre",
                            "featureValues": "americana, tsf_exclusive_Folk, tsf_exclusive_folk"
                        },
                        {
                            "featureType": "Annotations",
                            "featureValues": "driving rhythm, Organic, Folky, rhythmic, organic, folky, scarce vocals, instrumentals, good drive, positive"
                        },
                        {
                            "featureType": "Modifiers",
                            "featureValues": "instrumental_stem_available"
                        }
                    ]
                },
                {
                    "valence": "Positive",
                    "features": [
                        {
                            "featureType": "Vibe",
                            "featureValues": "danceable, dynamic, reflective, rhythmic"
                        },
                        {
                            "featureType": "Production",
                            "featureValues": "clean, vocals_with_music, studio, instrumental"
                        },
                        {
                            "featureType": "Arrangement",
                            "featureValues": "organic_acoustic_or_electric, organic_electric_or_electronic, electric_or_electronic"
                        },
                        {
                            "featureType": "Shape",
                            "featureValues": "calm_intro_or_fade_in, calm_outtro_or_fade_out, multiple_crescendos"
                        },
                        {
                            "featureType": "Tempo",
                            "featureValues": "midtempo, uptempo"
                        },
                        {
                            "featureType": "Popularity",
                            "featureValues": "known, popular"
                        },
                        {
                            "featureType": "Genre",
                            "featureValues": "chamber pop, folk-pop, indie anthem-folk, indie folk, indiecoustica, neo mellow, new americana, stomp and holler, indie pop, modern rock, americana, tsf_exclusive_folk"
                        },
                        {
```

```
            "featureType": "Annotations",
            "featureValues": "matthew and the atlas, an artist on spotify,
jacksonville beach, florida-based radical face is primarily ben cooper, who
is also one-half of similar quiet-is-the-new-loud duo electric president."
          },
          {
            "featureType": "RelatedArtists",
            "featureValues": "matthew and the atlas, benjamin francis
leftwich, roo panes, johnny flynn, the paper kites, james vincent mcmorrow,
dustin tebbutt, sons of the east, nathaniel rateliff, horse feathers, bear's
den, luke sital-singh, beta radio, stu larsen, fionn regan, little may, dry
the river, s. carey, donovan woods, gregory alan isakov, blind pilot, radical
face, electric president, sea wolf, noah and the whale, the tallest man on
earth, rogue wave, alexi murdoch, freelance whales, milo greene, margot & the
nuclear so and so's, edward sharpe & the magnetic zeros, the oh hellos,
volcano choir, william fitzsimmons"
          }
        ]
      },
      {
        "valence": "Neutral",
        "features": [
          {
            "featureType": "Release",
            "featureValues": "contemporary, 2010_and_later, 00s"
          }
        ]
      },
      {
        "valence": "Negative",
        "features": [
          {
            "featureType": "Vibe",
            "featureValues": "emotional, quirky"
          },
          {
            "featureType": "Tempo",
            "featureValues": "downtempo"
          },
          {
            "featureType": "Genre",
            "featureValues": "downtempo, melancholia, slow core, emo"
          },
          {
            "featureType": "Annotations",
            "featureValues": "kitschy"
          }
        ]
      },
      {
        "valence": "HighlyNegative",
        "features": [ ]
      }
    ]
  },
  "mapreferences": [
    {
      "id": "1df2916c-eaf8-4ef9-a172-d26f44334fa0",
      "catalogId": "tsfreferencemapcatalogid",
      "songName": "I Will Remain",
      "searchableSongName": "Will Remain",
      "isrc": "GB6TW1000022",
      "owner": "",
      "groupOwners": "",
      "songPreviewUrl":
"http://open.spotify.com/embed?uri=spotify:track:52VPecMGJQOxyWWWgnUvsI",
      "songArtUrl":
"https://i.scdn.co/image/633249e04849b2463033c9165131d2dcb479a61c",
      "songDuration": 206546,
      "artistName": "Matthew And The Atlas",
      "artistUrl":
"http://open.spotify.com/embed?uri=spotify:artist:01SEN13bteP8p2NbiSP7RM",
      "albumName": "To the North",
      "searchableAlbumName": "To the North",
      "albumUrl":
```

```
"http://open.spotify.com/embed?uri=spotify:album:0cKaHI9t8En1ykEdIRspw3",
        "releaseDate": "2010-04-11",
        "releaseDatePrecision": "day",
        "cSF": "danceable, dynamic, reflective, clean, vocals_with_music,
studio, organic_acoustic_or_electric, calm_intro_or_fade_in,
calm_outtro_or_fade_out, multiple_crescendos, midtempo, known, contemporary,
2010_and_later",
        "gF": "chamber pop, folk-pop, indie anthem-folk, indie folk,
indiecoustica, neo mellow, new americana, stomp and holler",
        "aF": "Matthew And The Atlas, an artist on Spotify",
        "iF": "",
        "raF": "Matthew And The Atlas, Benjamin Francis Leftwich, Roo Panes,
Johnny Flynn, The Paper Kites, James Vincent McMorrow, Dustin Tebbutt, Sons
Of The East, Nathaniel Rateliff, Horse Feathers, Bear's Den, Luke Sital-
Singh, Beta Radio, Stu Larsen, Fionn Regan, Little May, Dry the River, S.
Carey, Donovan Woods, Gregory Alan Isakov, Blind Pilot",
        "lyrics": "",
        "score": 0,
        "thematicHighlights":
    },
    {
        "id": "587626b4-62aa-4c80-87e0-898a9802b71e",
        "catalogId": "tsfreferencemapcatalogid",
        "songName": "Wrapped In Piano Strings",
        "searchableSongName": "Wrapped In Piano Strings",
        "isrc": "DEX260606906",
        "owner": "",
        "groupOwners": "",
        "songPreviewUrl":
"http://open.spotify.com/embed?uri=spotify:track:0r7EiYTNNP0WCzcaefN6TZ",
        "songArtUrl":
"https://i.scdn.co/image/cc2e484ac2102ccb73bb45d0ed1aa7d141809598",
        "songDuration": 216613,
        "artistName": "Radical Face",
        "artistUrl":
"http://open.spotify.com/embed?uri=spotify:artist:5EM6xJN2QNk0cL7EEm9HR9",
        "albumName": "Ghost",
        "searchableAlbumName": "Ghost",
        "albumUrl":
"http://open.spotify.com/embed?uri=spotify:album:0VYi6aRMwxXpfvNwDCr3bB",
        "releaseDate": "2007",
        "releaseDatePrecision": "year",
        "cSF": "rhythmic, dynamic, reflective, clean, vocals_with_music,
studio, organic_electric_or_electronic, calm_intro_or_fade_in,
calm_outtro_or_fade_out, multiple_crescendos, uptempo, midtempo, known,
popular, contemporary, 00s",
        "gF": "chamber pop, folk-pop, indie folk, indie pop, modern rock,
stomp and holler",
        "aF": "Jacksonville Beach, Florida-based Radical Face is primarily
Ben Cooper, who is also one-half of similar quiet-is-the-new-loud duo
Electric President.",
        "iF": "",
        "raF": "Radical Face, Electric President, Blind Pilot, Sea Wolf,
Horse Feathers, Noah And The Whale, S. Carey, The Tallest Man On Earth,
Matthew And The Atlas, Rogue Wave, Alexi Murdoch, Gregory Alan Isakov,
Freelance Whales, Benjamin Francis Leftwich, Milo Greene, Margot & The
Nuclear So And So's, Dry the River, Edward Sharpe & The Magnetic Zeros, The
Oh Hellos, Volcano Choir, William Fitzsimmons",
        "lyrics": "",
        "score": 0,
        "thematicHighlights": ""
    }
  ]
 }
}
```

Having translated a natural language description into a common language (e.g., musical features of a music description and categorization schema), a search query can be generated from the translated features and a search can be performed to identify potential matches. Any searchable index can be used as the target of the search (e.g., catalog index 220, one or more ingested third party catalogs, one or more external third party catalogs, etc.). In embodiments that search catalog index 220, a corpus of potentially millions of songs over many ingested catalogs may be searched. Various full text search engines can be implemented using custom schemas, as would be understood by a person of ordinary skill in the art. Accordingly, a matchmaking system can be implemented using query generation, result ranking and results filtering.

Figure 5:
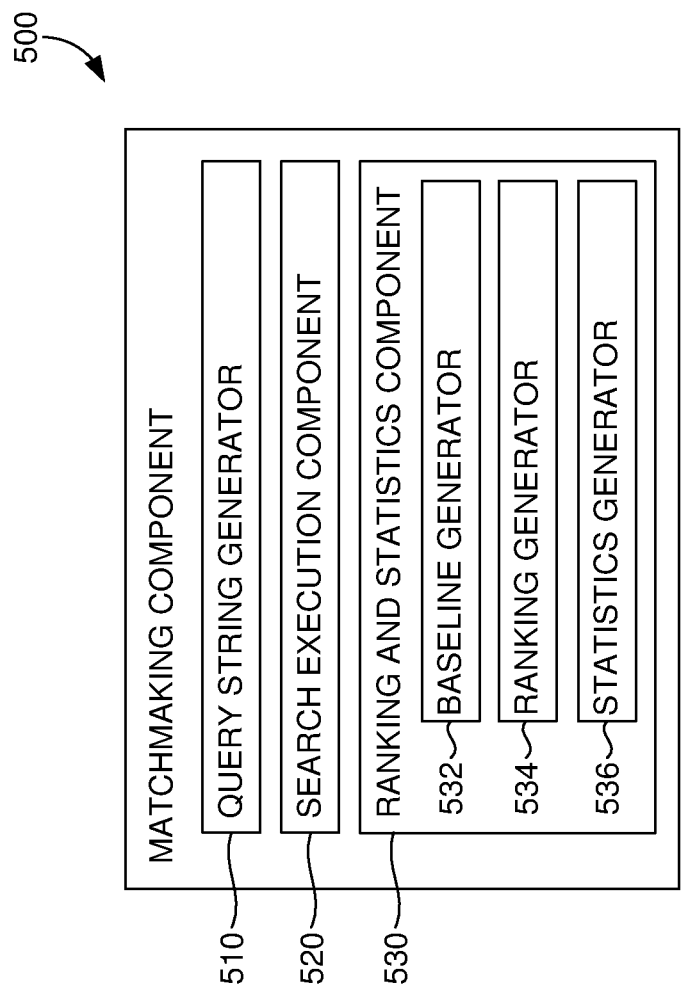
FIG. 5 is a block diagram of an exemplary matchmaking component, in accordance with embodiments described herein.

Turning now to FIG. 5, FIG. 5 illustrates exemplary matchmaking component 500 (which may correspond to matchmaking component 290 of FIG. 2). Matchmaking component 500 includes query string generator 510, search execution component 520 and ranking and statistics component 530. Generally, query string generator 510 generates a query string from a set of schema features (e.g., using the feature map), search execution component 520 executes a search on a defined index using the generated query string, and ranking and statistics component 530 performs an analysis of search results to facilitate efficient user review.

Query string generator 510 can generate a query string from a set of schema features to be searched (e.g., translated and stored in a feature map), for example, by generating query terms for corresponding schema categories and/or valence categorizations using one or more query term profiles. Generally, a query term profile is a collection of information that can be used to generate query terms. A query term profile (e.g., query term profiles 240a through 240n in FIG. 2) can be defined with query term generators (e.g., query term generators 242) for schema categories, schema features and/or valence levels. A query term generator may include a set of term generation rules and/or a query term shell that can be populated using defined query term characteristics for schema categories, schema features and/or valence levels in order to emit specific instances of query terms during query generation. For example, in a music description and categorization schema, a query term generator for an Arrangement category can generate a query term for musical features to be searched from that category (e.g., arrangement:general:acoustic). In this example, the query term generator (i) uses query term characteristics for the Arrangement category defined in a query term profile and (ii) uses the musical feature to be searched (e.g., acoustic) as a keyword. Additionally and/or alternatively, a query term generator for a particular valence level can generate a query term for musical features that were assigned to that valence level using query term characteristics for that valence level in the query term profile. In this manner, query terms can be generated for a set of features to be searched and a query string constructed from the query terms.

Query terms can be generated using query term characteristics for schema categories, schema features and/or valence levels that can be defined to facilitate generation of query terms. Query term characteristics can include characters for the query term, boost multipliers, outer prefix control, and the like. Boost multipliers can be set to define the relative importance of schema categories, schema features and/or valence levels using score multiplication factors for given categories, features and/or valences, as explained in more detail below with respect to ranking and statistics component 530. An outer prefix control can be set to define whether a query term for a particular schema category, schema feature and/or valence level is a "hard" filter (i.e., a search result must match at least one keyword for a particular schema category, schema feature and/or valence categorization) or a "soft" filter (a search result need not match a keyword for a particular schema category, schema feature and/or valence categorization, but scoring may be affected). Table 5 describes example query term characteristics that can be defined for a query term profile. In some embodiments, additional query term profiles can be defined to produce alternative search constraints. For example, one query term profile can be defined using a primary set of boost multipliers, and a second query term profile can be defined using a wildcard set of boost multipliers. In the embodiment depicted in FIG. 2, query term profile 240a can be designated as a primary profile, including query term generators 242, boost multipliers 244 and outer prefix controls 246. Meanwhile, query term profile 240n can be designated as a wildcard profile with relaxed search criteria in order to expand the universe of search results.

TABLE 5

| Type | Tag | Prefix | Open Mark | Close Mark | Primary Boost Multiplier | Wildcard Boost Multiplier | Filter |
|---|---|---|---|---|---|---|---|
| Valence | HighlyPositive | + | ( | ) | 10 | 10 | Hard |
| Valence | Positive | + | ( | ) | 5 | 5 | Hard |
| Valence | Neutral | N/A | ( | ) | 1 | 1 | Hard |
| Valence | Negative | – | ( | ) | 5 | 5 | Hard |
| Valence | HighlyNegative | – | ( | ) | 10 | 10 | Hard |
| Feature | Vibe | cSF: | " | " | 14 | 13 | Hard |
| Feature | Arrangement | cSF: | " | " | 10 | 9 | Soft |
| Feature | Shape | cSF: | " | " | 8 | 7 | Soft |
| Feature | Themes | tF: | " | " | 7 | 11 | Soft |
| Feature | TranslatedThemes | tF: | " | " | 4 | 4 | Soft |
| Feature | Tempo | cSF: | " | " | 4 | 4 | Hard |
| Feature | Production | cSF: | " | " | 4 | 4 | Hard |
| Feature | Popularity | cSF: | " | " | 2 | 2 | Soft |
| Feature | Release | cSF: | " | " | 2 | 2 | Hard |
| Feature | Genre | gF: | " | " | 1.2 | 1 | Hard |
| Feature | Annotations | aF: | " | " | 1 | 7 | Soft |
| Feature | Instruments | iF: | " | " | 1 | 1 | Soft |
| Feature | RelatedArtists | raF: | " | " | 1 | 1.5 | Soft |
| Exclusion | GenreExclusions | -gF: | " | " | 1.2 | 1 | Hard |

In an exemplary embodiment, query string generator 510 generates a query string from a set of schema features to be searched (e.g., from a feature map) using a defined query term profile. Preferably, a feature map is organized by valence level (e.g., so all the features categorized in a Highly Positive valence level can be processed together, all the features categorized in a Positive valence level can be processed together, etc.). For each valence level appearing in the feature map, query string generator 510 accesses a query term generator for the valence level (skipping valence levels undefined in the corresponding query term profile). For each schema category of the features appearing in that valence level in the feature map, query string generator 510 accesses a query term generator for the schema category. In this manner, query string generator 510 generates query terms for each feature appearing in the feature map based on query term generators for corresponding schema categories and valence levels.

In some embodiments, query string generator 510 generates exclusion terms. Generally, some schema features can imply negative conditions. For example, particular music release eras (e.g., musical features in the release:era schema category) can imply a rejection of particular genres. Accordingly, one or more genre exclusions can be defined, for example, to prevent a search for new or unreleased music (e.g., release:era: 2010_and_later) from matching songs in the "adult classics" genre. Exclusions such as genre exclusions can be stored, for example, in a dictionary (e.g., dictionary 210). In some embodiments, exclusions can be personalized for a given user. Generally, it is possible for users to imply different constraints using the same language. For example, when different users refer to pop, the users might actually mean to suggest different sub-genres of pop. Accordingly, some embodiments can include personalized dictionaries for a particular user or group of users. In this manner, query string generator 510 can access defined exclusions to generate exclusion terms applicable to features to be searched (e.g., features appearing in the feature map).

Query string generator 510 combines the generated query terms for a given valence level to generate a combined query term for that valence level. In embodiments that include exclusions, query string generator 510 includes generated exclusion terms in the combined query term. This process can be repeated for each valence level appearing in the feature map, and the resulting terms for each valence level combined to form the query string. In some embodiments, query string generator 510 identifies a target catalog from terms metadata, generates a corresponding catalog constraint, and includes catalog constraints in the query string. In this manner, query string generator 510 can generate a query string from a set of features to be searched. Below is an example query string that can be generated based on a music description and categorization schema, including boost multipliers:

```
+(cSF:"rhythmic"^14.0 cSF:"danceable"^14.0 cSF:"happy"^14.0
cSF:"euphoric"^14.0)^10.0 +(cSF:"vocals_with_music"^4.0
cSF:"instrumental"^4.0)^10.0 (cSF:"organic_acoustic_or_electric"^10.0
cSF:"acoustic"^10.0)^10.0 +(cSF:"midtempo"^4.0 cSF:"uptempo"^4.0)^10.0
+(gF:"Folk"^1.2 gF:"folk"^1.2)^10.0 -gF:"folk metal"^1.2 -gF:"folk punk"^1.2
-gF:"folk metal"^1.2 -gF:"folk punk"^1.2 (aF:"driving rhythm"^1.0
aF:"Organic"^1.0 aF:"Folky"^1.0 aF:"rhythmic"^1.0 aF:"organic"^1.0
aF:"folky"^1.0 aF:"nice"^1.0 aF:"scarce"^1.0 aF:"vocals"^1.0
aF:"instrumentals"^1.0 aF:"good drive"^1.0 aF:"positive"^1.0)^10.0
+(cSF:"danceable"^14.0 cSF:"dynamic"^14.0 cSF:"reflective"^14.0
cSF:"rhythmic"^14.0)^5.0 +(cSF:"clean"^4.0 cSF:"vocals_with_music"^4.0
cSF:"studio"^4.0 cSF:"instrumental"^4.0)^5.0
(cSF:"organic_acoustic_or_electric"^10.0
cSF:"organic_electric_or_electronic"^10.0
cSF:"electric_or_electronic"^10.0)^5.0 (cSF:"calm_intro_or_fade_in"^8.0
cSF:"normal_outtro"^8.0 cSF:"multiple_crescendos"^8.0
cSF:"calm_outtro_or_fade_out"^8.0)^5.0 +(cSF:"midtempo"^4.0
cSF:"uptempo"^4.0)^5.0 (cSF:"known"^2.0 cSF:"popular"^2.0)^5.0
+(cSF:"contemporary"^2.0 cSF:"2010_and_later"^2.0 cSF:"00s"^2.0)^5.0
+(gF:"acoustic pop"^1.2 gF:"chamber pop"^1.2 gF:"folk-pop"^1.2 gF:"indie
anthem-folk"^1.2 gF:"indie folk"^1.2 gF:"new americana"^1.2 gF:"stomp and
holler"^1.2 gF:"indie pop"^1.2 gF:"folk"^1.2)^5.0 -gF:"folk metal"^1.2 -
gF:"folk punk"^1.2 -gF:"adult standards"^1.2 -gF:"classic *"^1.2 (aF:"matthew
and the atlas"^1.0 aF:"an artist on spotify"^1.0 aF:"jacksonville beach"^1.0
aF:"florida-based radical face is primarily ben cooper"^1.0 aF:"who is also
one-half of similar quiet-is-the-new-loud duo electric president."^1.0)^5.0
(raF:"matthew and the atlas"^1.0 raF:"benjamin francis leftwich"^1.0
raF:"marcus foster"^1.0 raF:"johnny flynn"^1.0 raF:"dry the river"^1.0
raF:"roo panes"^1.0 raF:"bear's den"^1.0 raF:"the paper kites"^1.0 raF:"luke
sital-singh"^1.0 raF:"stu larsen"^1.0 raF:"dustin tebbutt"^1.0 raF:"horse
feathers"^1.0 raF:"james vincent mcmorrow"^1.0 raF:"little may"^1.0 raF:"beta
radio"^1.0 raF:"s. carey"^1.0 raF:"novo amor"^1.0 raF:"donovan woods"^1.0
raF:"gregory alan isakov"^1.0 raF:"i am oak"^1.0 raF:"sons of the east"^1.0
raF:"radical face"^1.0 raF:"electric president"^1.0 raF:"sea wolf"^1.0
raF:"blind pilot"^1.0 raF:"noah and the whale"^1.0 raF:"the tallest man on
earth"^1.0 raF:"rogue wave"^1.0 raF:"alexi murdoch"^1.0 raF:"milo greene"^1.0
raF:"the oh hellos"^1.0 raF:"freelance whales"^1.0 raF:"the middle east"^1.0
raF:"volcano choir"^1.0 raF:"william fitzsimmons"^1.0)^5.0 -
(cSF:"kitschy"^14.0)^5.0 -(aF:"kitschy"^1.0)^5.0
```

Below is an example catalog document that can be generated for a search result, including a ranking score. This example document is merely meant as an example. Other variations of documents, data structures and/or corresponding fields may be implemented within the present disclosure.

```
{
    "id": "16e6ced0-eff1-4349-bda2-
f427aa7597e0::spotify:track:07ZkpHysDtnBHQKbEOBZ2L",
    "catalogId": "16e6ced0-eff1-4349-bda2-f427aa7597e0",
    "songName": "Rivers",
    "searchableSongName": "Rivers",
```

-continued

```
"songPreviewUrl":
"http://open.spotify.com/embed?uri=spotify:track:07ZkpHysDtnBHQKbEOBZ2L",
    "songDuration": 236853,
    "artistName": "The Tallest Man On Earth",
    "artistUrl":
"http://open.spotify.com/embed?uri=spotify:artist:2BpAc5eK7Rz5GAwSp9UYXa",
    "albumName": "Rivers",
    "searchableAlbumName": "Rivers",
    "albumUrl": "",
    "releaseDate": "Wed Aug 17 00:00:00 PDT 2016",
    "releaseDatePrecision": "",
    "cSF": "rhythmic, mellow, reflective, clean, vocals_with_music, studio,
acoustic, calm_intro_or_fade_in, normal_outtro, multiple_crescendos,
midtempo, popular, new, 2010_and_later",
    "gF": "chamber pop, folk-pop, freak folk, indie folk, indie pop, indie
rock, neo mellow, new americana, singer-songwriter, stomp and holler",
    "aF": "Playing spare but tuneful indie folk enlivened by his sometimes
craggy, always passionate vocals and poetic lyrics, the Tallest Man on Earth
is the stage name of Swedish singer and songwriter Kristian Matsson.",
    "iF": "",
    "raF": "The Tallest Man On Earth, Horse Feathers, Blind Pilot, Johnny
Flynn, Iron & Wine, Phosphorescent, M. Ward, Deer Tick, Fleet Foxes, Volcano
Choir, Langhorne Slim, Gregory Alan Isakov, Alexi Murdoch, Damien Jurado,
Noah And The Whale, J. Tillman, Edward Sharpe & The Magnetic Zeros, Fruit
Bats, Andrew Bird, Radical Face, Joe Pug",
    "lyrics": "",
    "score": 3.4226194637764458
}
```

Generally, search execution component 520 executes a search using the generated query string on a defined index (e.g., catalog index 220). Various full text search engines can be implemented using custom schemas, as would be understood by a person of ordinary skill in the art. In order to facilitate ranking and review, for each search result, search execution component 520 can create a record (e.g., a catalog document), and add the record to a primary search result set and/or a hashmap (e.g., for statistical analysis). The search process can be stopped once it produces a defined limit for the number of search results. In some embodiments, search execution component 520 can execute one or more alternate (e.g., wildcard) queries using relaxed search criteria (e.g., relaxed boost multipliers). For each wildcard search result, if the result does not appear in the primary search result set and/or hashmap, search execution component 520 can create a record (e.g., a catalog document), and add the record to a wildcard search result set and/or a wildcard hashmap (e.g., for statistical analysis). The wildcard search process can be stopped once it produces a defined limit for the number of wildcard search results.

Ranking and statistics component 530 performs an analysis on search results to facilitate efficient user review. In the embodiment depicted by FIG. 5, ranking and statistics component 530 includes baseline generator 532, ranking generator 534 and statistics generator 536. Baseline generator 532 can generate a baseline score that can be used to rank search results. For example, baseline generator 532 can access a system document that includes a representation of all schema features appearing in a catalog, for example, an all-match document including a representation of all musical features appearing in the catalog index. The all-match document is a match for every possible query, excluding negative terms and transforming some terms e.g. related artists, and partitioned keywords. Accordingly, baseline generator 532 preferably removes negative query terms from the query string and transforms some runtime terms to the query string before applying the resulting query to the all-match document. In this manner, baseline generator 532 executes a search on the all-match document using the generated query string, or a derivation thereof, to produce a baseline maximum score (e.g., an "all-match score"). For example, boost multipliers for each matched query term in the query string can be combined (e.g., added) to generate the all-match score.

The all-match score can be adjusted (e.g., by one or more tunable numeric factors) based on overmatching potential and/or query complexity. Overmatching of a query string to the all-match document can occur based on an exclusion of negative terms (broadening the surface area of the baseline request). Moreover, certain keyword combinations may be unlikely or even not allowed (e.g., keywords corresponding to musical features from a partitioned schema category). Overmatching (or undermatching) can increase with an increasing query complexity (e.g., the number of query terms). Accordingly, the all-match score may be adjusted by one or more factors.

Ranking generator 534 and/or statistics generator 536 determine scores for returned search results and matched keywords. For example, ranking generator 534 can identify a ranking score for each search result (e.g., each catalog document in a primary/wildcard results set) based on boost multipliers for matched query terms for that search result. For example, boost multipliers for each matched query term in the query string can be combined (e.g., added) for a given search result to generate the ranking score for that search result. Statistics generator 536 can convert ranking scores to normalized scores (e.g., on a fixed scale such as five stars) using the all-match document as the baseline for a strong match. Additionally and/or alternatively, statistics generator 536 can compute statistics on collections of scored search results (e.g., count, mean score, and standard deviation). For example, for each schema facet (i.e., category, subcategory, category instance) that includes a search result, statistics generator 536 can determine a count of returned search results for the facet. For example, for each matched keyword (musical feature), statistics generator 536 can determine a count of the number of songs (e.g., catalog documents) that matched the keyword. In some embodiments, statistics generator 536 initializes the statistics using a baseline (e.g., the all-match score) to influence standard deviation computations. In this manner, matchmaking component 500 generates ranks and computes statistics for search results.

Figure 6:
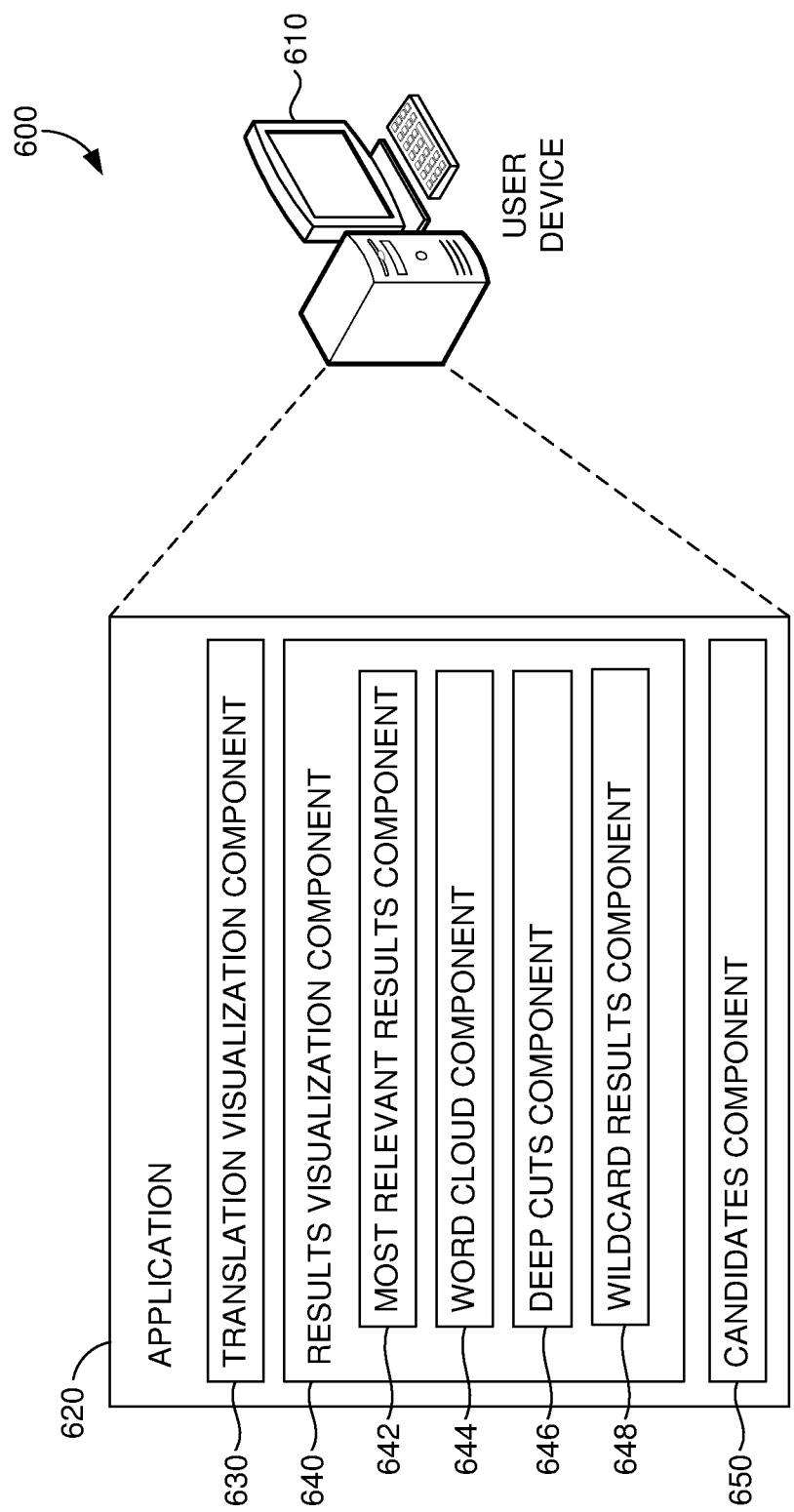
FIG. 6 is a block diagram of an exemplary user application, in accordance with embodiments described herein.

Having narrowed the result space (e.g., from potentially millions to hundreds of the most relevant songs), tools are provided for efficiently sifting through the search results, and for selecting and sharing candidate songs. Turning now to FIG. 6, FIG. 6 illustrates exemplary environment 600 with user device 610 and application 620 (which may correspond to app 115 in FIG. 1). The application may be a stand-alone application, a mobile application, a web application, or the like. Generally, a user inputs a natural language description of music into an application (e.g., application 620) on a user device (e.g., user device 610), and the application provides a user interface that provides the user with one or more visualizations of search results and/or enables the user to select candidate songs, share selected songs, and the like.

In the embodiment depicted in FIG. 6, application 620 includes translation visualization component 630, results visualization component 640 and candidates component 650. Likewise, in the embodiment depicted in FIG. 6, results visualization component 640 includes most relevant results component 642, word cloud component 644, deep cuts component 646 and wildcard results component 648. Generally, translation visualization component 630 provides a visualization of a translated search (e.g., schema features, genres, related artists, etc., generated from a raw input). Most relevant results component 642 provides a visualization of the most relevant (e.g., highest ranked) search results from a primary search result set. Deep cuts component 646 provides a visualization of additional search results from the primary search result set. Word cloud component 644 generates and provides word cloud representations of matched keywords (i.e., schema features) and/or schema categories from of a translated search (e.g., to filter results based on generated schema features and/or schema categories.). Wildcard results component 648 provides a visualization of search results from a wildcard search set. Candidates component 650 provides a visualization of search results that have been selected as candidate songs (e.g., tagged by a user). Of course, these visualizations are merely exemplary, and variations of visualizations can be implemented by a person of ordinary skill in the art.

Figure 7:
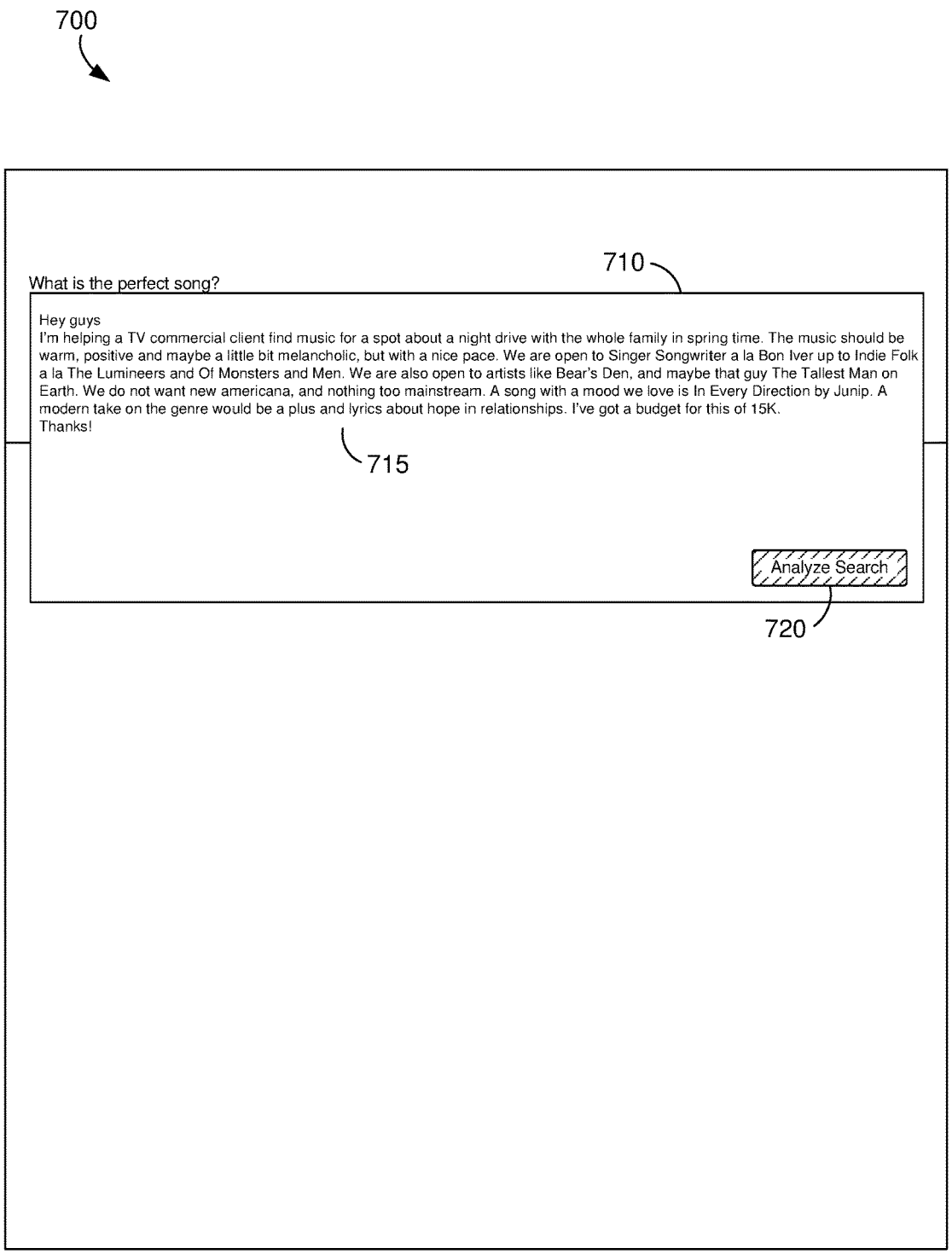
FIG. 7 is an exemplary user interface depicting a natural language input comprising a description of music, in accordance with embodiments described herein.

Turning now to FIGS. 7-14, FIGS. 7-14 depict exemplary user interfaces of an application such as application 620 of FIG. 6. FIG. 7 illustrates exemplary user interface 700 for receiving a natural language input comprising a description of music. User interface 700 includes input field 710 and analyze search button 720. Generally, a user enters a natural language description of music such as music description 715 and presses analyze search button 720 to perform a search for music that matches the description.

FIGS. 8-14 depict exemplary user interfaces that include some common elements. For example, the depicted user interfaces include navigational buttons that allow a user to navigate between screens with visualizations of the translated search, search results and candidate songs. For example, search buttons 820, 920, 1020, 1120, 1320 and 1420 allow a user to navigate to user interface 800 depicting a visualization of the translated search. Marketplace buttons 822, 922, 1022, 1122, 1222, 1322 and 1422 allow a user to navigate to a user interface depicting a visualization of search results (e.g., user interfaces 900, 1000, 1100, 1200 or 1300). Candidates buttons 824, 924, 1024, 1124, 1224, 1324 and 1424 allow a user to navigate to user interface 1400 depicting a visualization of songs selected by a user as candidate songs. When a particular user interface is selected, a corresponding button may be highlighted, shaded or otherwise indicate the selected user interface. For example, search button 820 is highlighted in FIG. 8, indicating user interface 800 with a visualization of a translated search is being presented.

The user interfaces depicted in FIGS. 8-14 also include a representation of the natural language being analyzed (in these examples, music description 715 of FIG. 7). For example, fields 810, 910, 1010, 1110, 1210, 1310 and 1410 are populated with a representation of music description 715, including a selection of extracted features. The features displayed in these fields can be selected to provide a distilled version of the input description, for example, by presenting schema features generated from the description. Edit search buttons 815, 915, 1015, 1115, 1215, 1315 and 1415 can be selected by a user to edit the description being analyzed.

FIG. 8 illustrates exemplary user interface 800 depicting a visualization of a translated search. User interface 800 can be generated by translation visualization component 630 of FIG. 6. Generally, user interface 800 can include visualization elements for build terms, a visual representation of the translated search and/or generated (i.e., extracted) schema features (e.g., core features, genres, related artists, etc.). For example, user interface 800 includes terms header 830 for build terms, including title 832 (which can be implied from the first line of the description of music being analyzed), deadline 834 and budget 836. Generally, a visualization of the analyzed description of music can be provided to indicate aspects of the translation. As such, user interface 800 includes search header 840 for analyzed search 845. In a visualization of the analyzed description, phrases from the description of music can be highlighted and/or formatted to indicate aspects of the translation (e.g., by highlighting phrases that were translated into schema features, striking out phases that were interpreted as negative sentiments, bolding phrases that were interpreted as a song reference, etc.). In this sense, the visualization of the analyzed description of music can provide a feedback mechanism for a user to understand and interpret the translation, and make changes, if necessary (e.g., via edit search button 815).

In some embodiments, a user interface can include visualizations of generated schema features. For example, user interface 800 includes extracted schema features header 850 and extracted schema features 855, extracted genres header 860 and extracted genres 865, and extracted related artists header 870 and extracted related artists 875. Visualizations of generated schema features can be features from selected schema categories (e.g., designated core schema categories such as extracted schema features 855). In some embodiments, one or more schema categories (e.g., genre, related artists, etc.) can be separated out and presented separately. In this manner, extracted genres 865 and extracted related artists 875 provide a visualization of features from selected schema categories. The selection and arrangement of schema categories from which to present generated features facilitates modifications to the translation. For example, a user can select edit buttons 857, 867 or 877 to make changes to extracted schema features 855, extracted genres 865 or extracted related artists 875, respectively.

In some embodiments, formatting of visual elements in various sections of the user interface can be matched to indicate an association. For example, the formatting of visual elements for a phrase of analyzed text, a corresponding schema feature, a corresponding schema category and/or one or more corresponding visual elements (e.g., a header, legend, text color, etc.) can be matched. In the example depicted in FIG. 8, highlighting of phrases in field 810 and analyzed search 845 matches the formatting (e.g., color, shading, etc.) of the header of a corresponding schema category below. More specifically, the formatting of extracted schema features header 850 (e.g., thatched pattern) matches the formatting of highlighting for phrases in analyzed search 845 and features in field 810 corresponding to the features in extracted schema features 855 (e.g., also thatched). Likewise, the formatting of extracted genre header 860 (e.g., dotted pattern) matches the formatting of highlighting for phrases in analyzed search 845 and features in field 810 corresponding to features in extracted genre 865 (e.g., also dotted). Similarly, the formatting of extracted related artist header 870 (e.g., vertical line pattern) matches the formatting of highlighting for phrases in analyzed search 845 and features in field 810 corresponding to features in extracted related artists 865 (e.g., also vertical lines). This format matching helps a user to understand and interpret the translation, and make changes, if necessary (e.g., via edit buttons 857, 867 or 877).

As such, user interface 800 provides a mechanism for a user to make changes, or tune, a translation. This tuning can be used to improve the translation. Generally, language translation using software (e.g., machine translation) can be improved using artificial intelligence (AI) techniques combined with access to Internet scale training data. Accordingly, in some embodiments, machine translation can be accomplished in two stages. The first stage uses natural language processing to translate a natural language description, as described above. A user interface such as user interface 800 can be provided to allow a user to validate, augment and/or correct the translated search. User decisions to validate, augment and/or correct can be archived and analyzed to generate translation training data. In this manner, a second stage of machine translation can use trained AI models to assist the first stage components, and over time, the combined techniques form a constantly improving translation system.

Turning now to FIGS. 9-13, FIGS. 9-13 depict exemplary user interfaces that include some common elements. For example, the depicted user interfaces include navigational buttons that allow a user to navigate between screens with a visualization of the most relevant results from a primary search set, word cloud visualizations that can filter search results by schema category and/or keyword, additional results from a primary search set, and search results from a wildcard search set. For example, Most Relevant buttons 926, 1026, 1126, 1226 and 1326 allow a user to navigate to user interface 900 depicting a visualization of the most relevant search results from a primary search set. Deep Cuts buttons 930, 1030, 1130, 1230 and 1330 and Wildcards buttons 932, 1032, 1132, 1232 and 1332 allow a user to navigate to a user interface similar to user interface 900, but depicting a visualization of additional results from a primary search set, and a visualization of search results from a wildcard search set, respectively. Word Clouds buttons 928, 1028, 1128, 1228 and 1328 allow a user to navigate to a user interface depicting one or more word clouds that can filter search results by schema category and/or keyword (e.g., user interfaces 1000, 1100, 1200 or 1300). When a particular user interface is selected, a corresponding button may be highlighted, shaded or otherwise indicate the selected user interface. For example, Most Relevant button 926 is highlighted in FIG. 9, indicating user interface 900 with a visualization of the most relevant search results is being presented.

Figure 9:
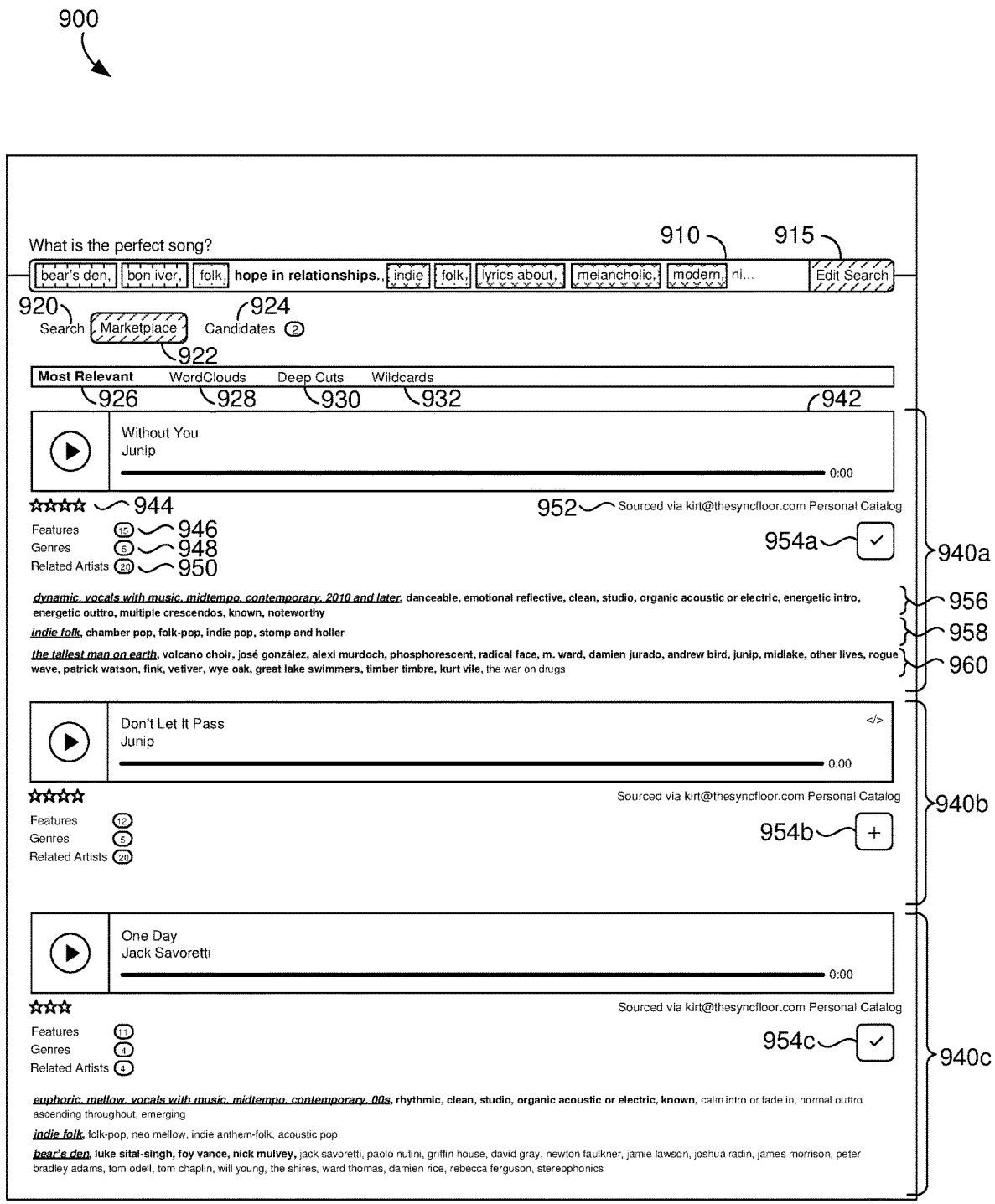
FIG. 9 is an exemplary user interface depicting a visualization of search results, in accordance with embodiments described herein.

FIG. 9 illustrates exemplary user interface 900 depicting a visualization of search results. User interface 900 can be generated by results visualization component 640 of FIG. 6 (e.g., most relevant result component 642). Generally, search results can be presented in various ways, such as by displaying lists, tiles or other representations of search results. Additionally and/or alternatively, search results can be presented using text (e.g., song title and artist, song description, etc.), one or more images (e.g., album art), embedded links (e.g., links to an audio or video recording of the song), embedded audio or video (e.g., an audio or video recording of the song), search ratings, matched schema features, statistics about matched schema features, source catalog, candidate song tags and the like, and any combination thereof.

For example, in the embodiment illustrated by FIG. 9, user interface 900 includes search results 940a, 940b and 940c. Search result 940a, for example, includes a corresponding playback button and progress bar 942, ranking score 944, matched schema features 956 (and corresponding matched features count 946), matched genres 958 (and corresponding matched genre count 948), matched related artists 960 (and corresponding matched related artists count 950), source catalog indicator 952 and candidate song tag 954a. If a user is interested in selecting a search result as a candidate song for further review, a candidate song tag can be selected for the search result. For example, in the embodiment illustrated by FIG. 9, candidate song tags 954a and 954c have been checked, while candidate song tag 954b has not. It should be understood that user interface 900 is merely exemplary. Variations on the arrangement and presentation of search results can be implemented within the present disclosure. Similar user interfaces can be provided to present visualizations of most relevant search results from a primary search set (e.g., the search results with the highest ranking score), additional results from a primary search set, search results from a wildcard search set, filtered search results (e.g., in connection with a keyword from a word cloud), selected candidate songs, and the like.

Turning now to FIGS. 10-13, FIGS. 10-13 depict exemplary user interfaces 1000, 1100, 1200 and 1300 that present word clouds that can be used to filter search results by schema category and/or keyword. User interfaces 1000, 1100, 1200 and 1300 can be generated by word cloud component 644 of FIG. 6. Generally, word clouds can be provided that correspond to selected schema categories and/or matched keyword. For example, a word cloud can be provided with phrases corresponding to matched keywords in a selected schema category, where the size of each matched keyword in the word cloud corresponds to the count of search results that matched that keyword. In this manner, a user can select a keyword in the word cloud to filter the search results to display results that matched the selected keyword.

Figure 10:
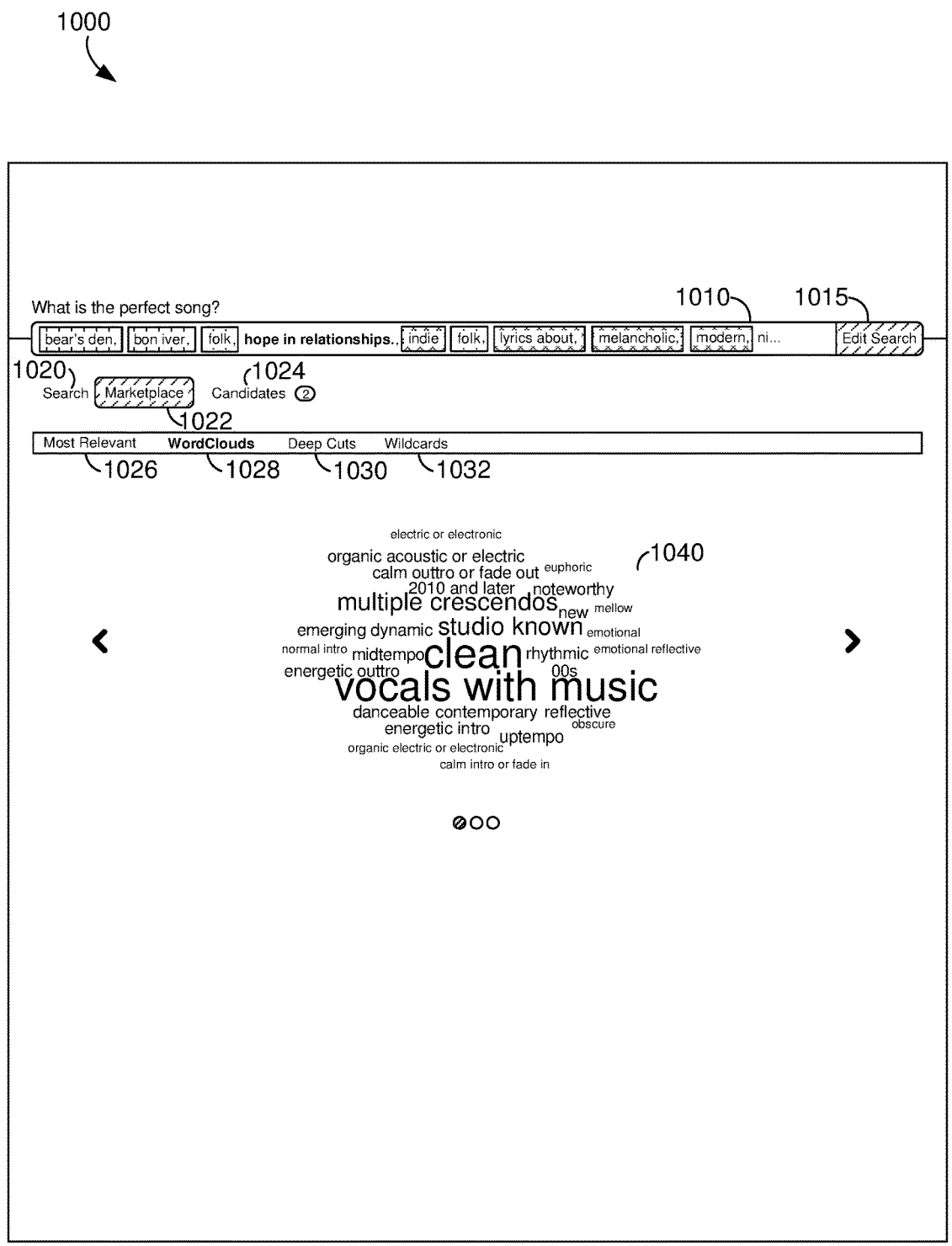
FIG. 10 is an exemplary user interface depicting a visualization of search results, in accordance with embodiments described herein.
Figure 11:
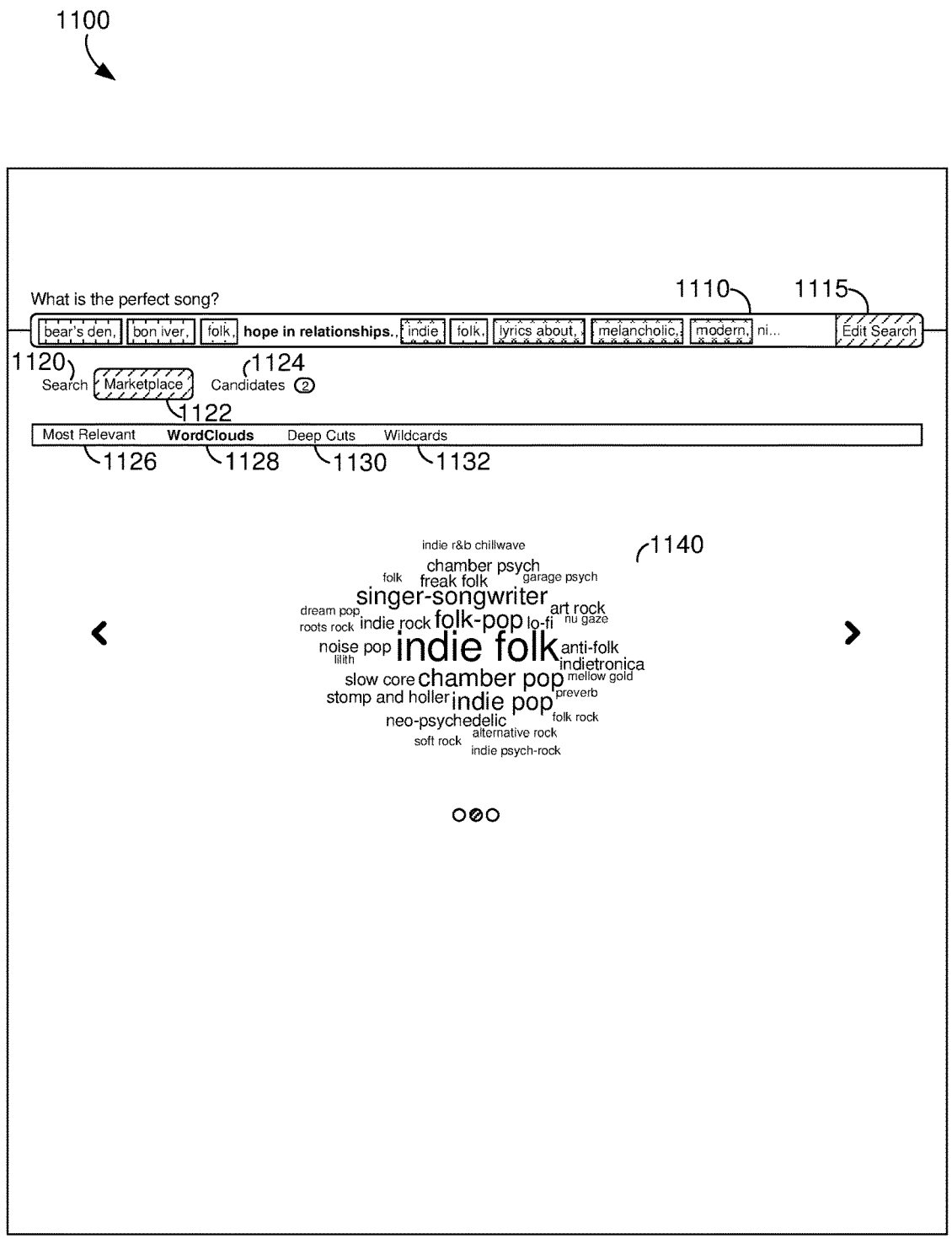
FIG. 11 is an exemplary user interface depicting a visualization of search results, in accordance with embodiments described herein.
Figure 12:
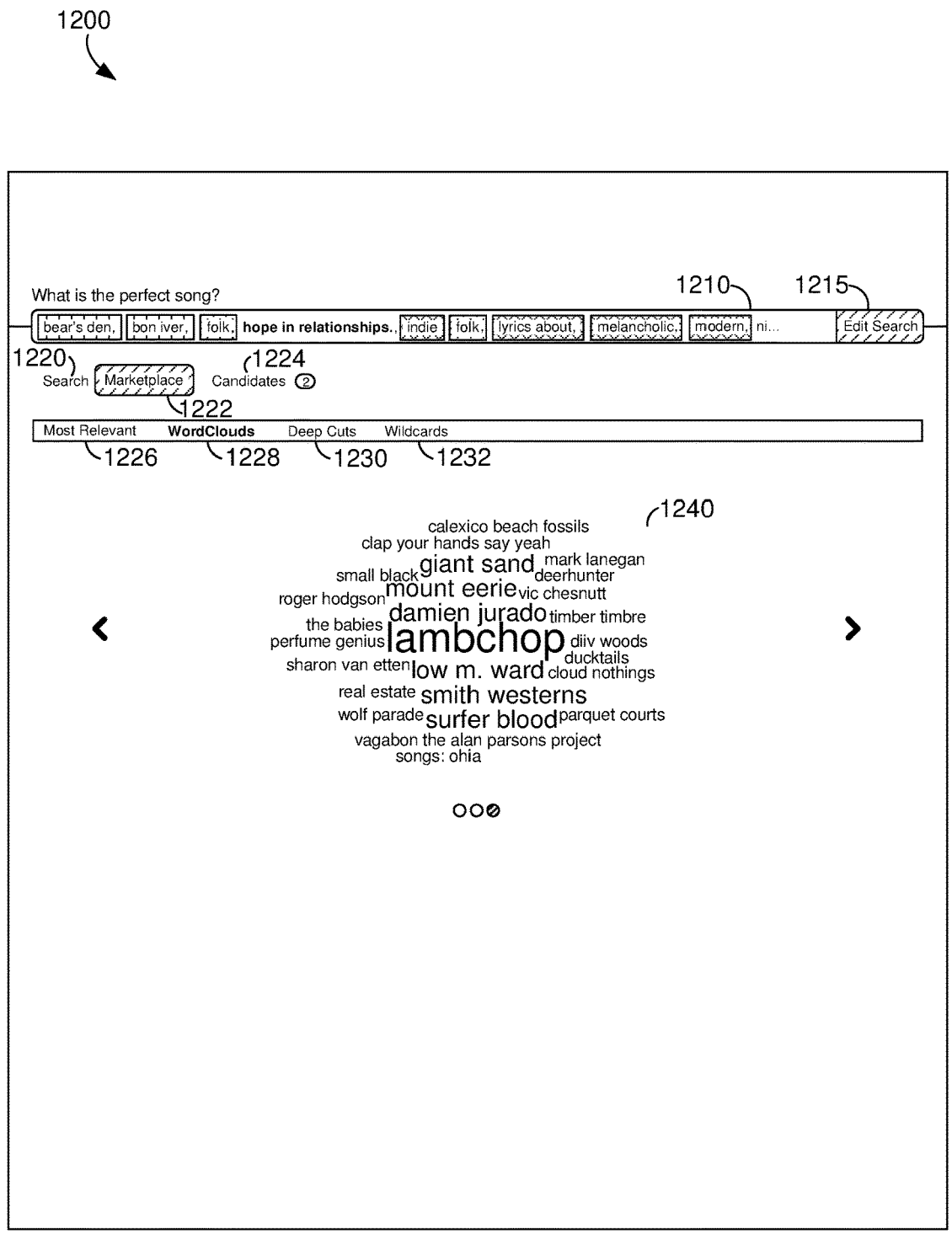
FIG. 12 is an exemplary user interface depicting a visualization of search results, in accordance with embodiments described herein.
Figure 13:
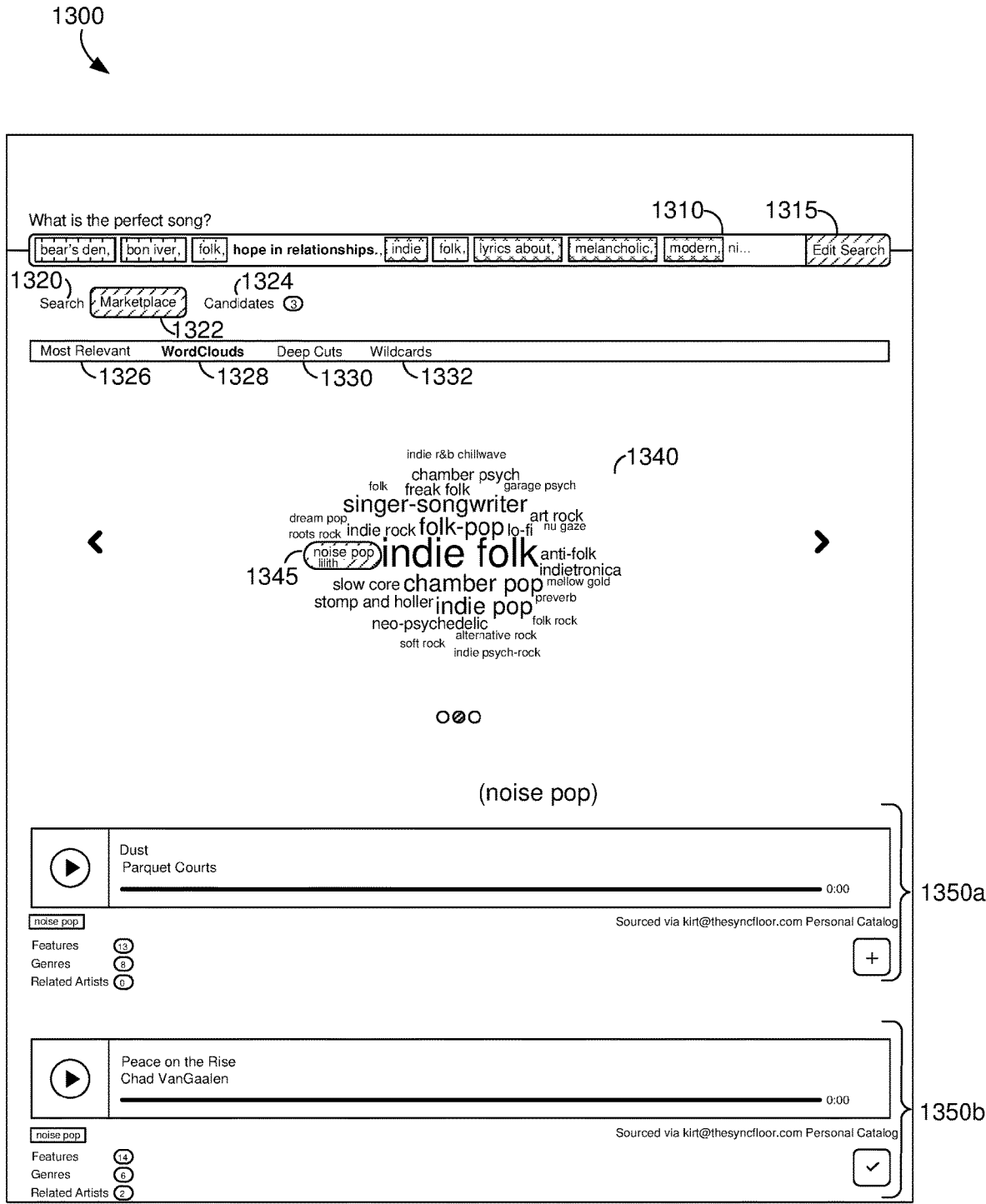
FIG. 13 is an exemplary user interface depicting a visualization of search results, in accordance with embodiments described herein.

Word clouds can be provided for selected schema categories. The selected schema categories can correspond with the categories of generated schema features presented in user interface 800 depicting a visualization of a translated search. For example, word clouds can be provided for matched core schema features, matched genres and matched related artists, to name a few possibilities. For example, word cloud 1040 of FIG. 10 depicts a word cloud with matched schema features corresponding to extracted schema features 855 of FIG. 8. Word clouds 1140 of FIGS. 11 and 1340 of FIG. 13 depict word clouds with matched genres corresponding to extracted genres 865 of FIG. 8. Word cloud 1240 of FIG. 12 depicts a word cloud with matched related artists corresponding to extracted related artists 875 of FIG. 8. Generally, a user interface can include navigational tools that allow a user to navigate between word clouds (e.g., left and right navigational arrows, links, etc.).

FIG. 13 illustrates a user interface with a matched genre word cloud and search results filtered by a selected genre. User interface 1300 includes word cloud 1340 depicting genre keywords that matched search results. One of the matched keywords (keyword 1345, i.e., noise pop) has been selected (as indicated by the highlighting of keyword 1345). In this embodiment, selecting a keyword from word cloud 1340 generates a visualization of search results filtered by the keyword (i.e., search results that matched the selected keyword). Accordingly, search results 1350a and 1350b are displayed on user interface 1300.

Figure 14:
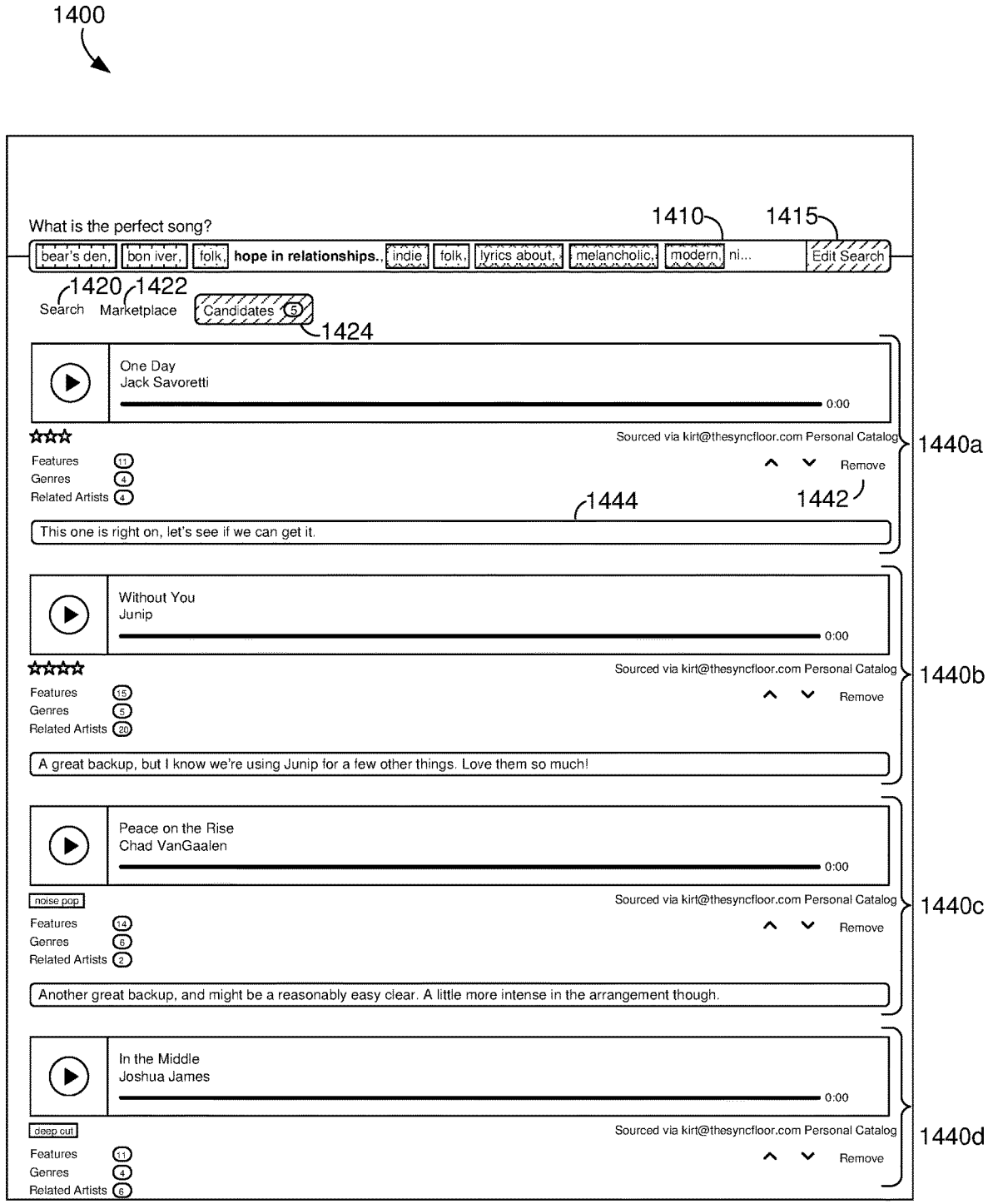
FIG. 14 is an exemplary user interface depicting a visualization of search results, in accordance with embodiments described herein.

Turning now to FIG. 14, FIG. 14 illustrates exemplary user interface 1400 depicting a visualization of candidate songs. User interface 1400 can be generated by candidates component 650 of FIG. 6. Generally, a user can select songs for further review (e.g., using candidate song tags on any of the previous user interfaces). User interface 1400 generally identifies songs that have been tagged as candidates and presents the candidate songs for review. For example, user interface 1400 includes candidate songs 1440a, 1440b, 1440c and 144d that were tagged as candidate songs. Songs can be presented with a removal button (e.g., remove button 1442) that can be selected to remove a song as a candidate (e.g., untag the song). Additionally and/or alternatively, songs can be presented with a notes field (e.g., notes field 1444) for user notes. In some embodiments, a user interface provides an indication of the number of candidate songs that have been tagged. For example, candidates buttons 1424 includes the number five, indicating that five songs have been tagged as candidates (although only four are displayed in the snapshot of user interface 1400). In some embodiments, the selection of candidate songs may be shared with other users.

Exemplary Flow Diagrams

With reference to FIGS. 15-19, flow diagrams are provided illustrating methods for generating search results from a natural language search request for music. Each block of methods 1500, 1600, 1700, 1800, 1900 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

Figure 15:
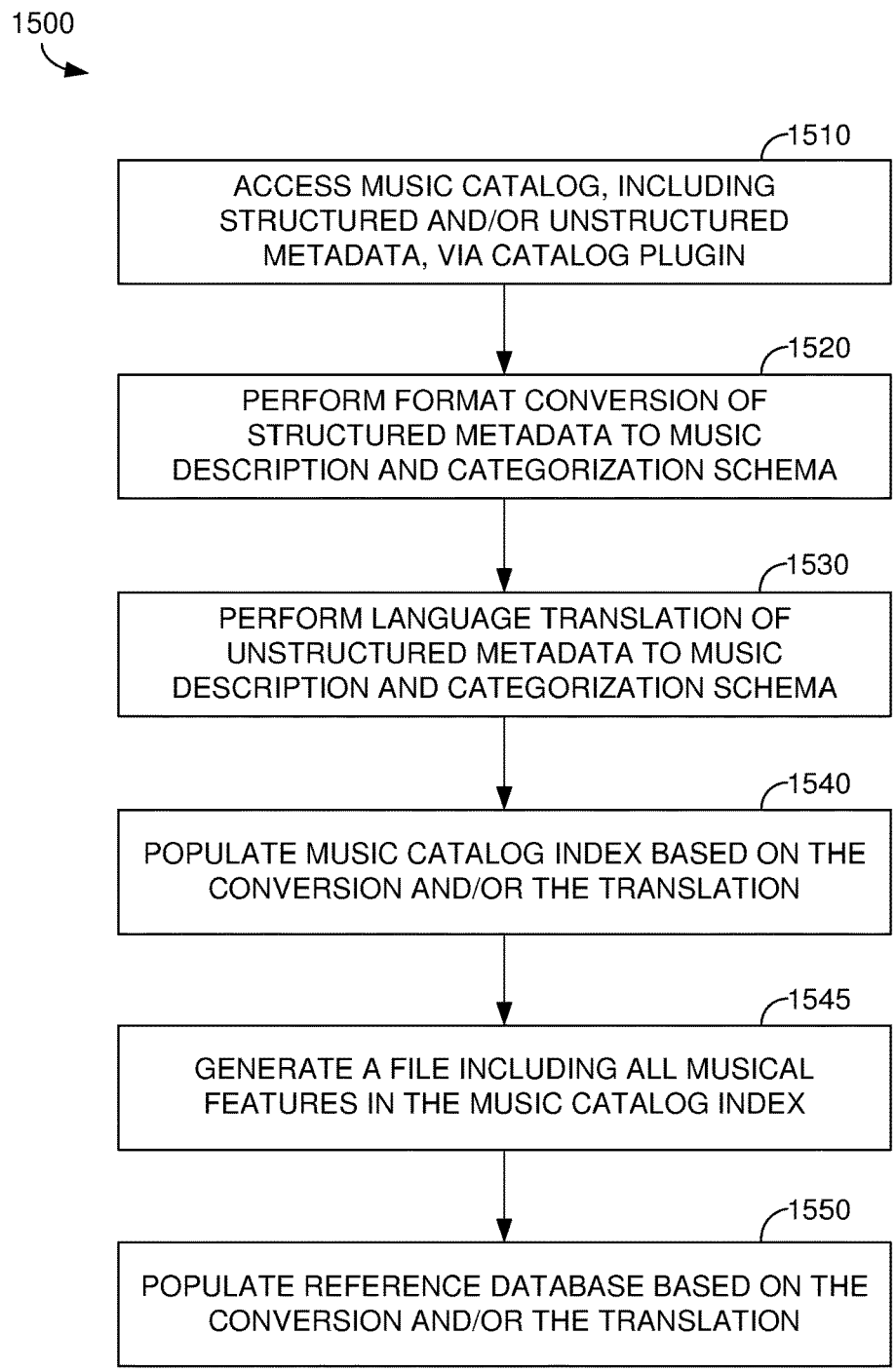
FIG. 15 is a flow diagram showing an exemplary method for ingesting music, in accordance with embodiments described herein.

Turning now to FIG. 15, a flow diagram is provided that illustrates a method 1500 for ingesting music. Initially at block 1510, a music catalog is accessed, including structured and/or unstructured metadata. The access can be facilitated using a catalog plugin. At block 1520, format conversion is performed to convert the structured metadata into corresponding musical features of a music description and categorization schema. At block 1530, language translation is performed to convert the unstructured metadata to corresponding musical features of the schema. At block 1540, a music catalog index is populated based on the format conversion and/or the language translation. At block 1545, a file is generated that includes all musical features appearing in the music catalog index. For example, the file can be an all-match document, as described herein. At block 1550, a reference database is populated based on the format conversion and/or the language translation.

Figure 16:
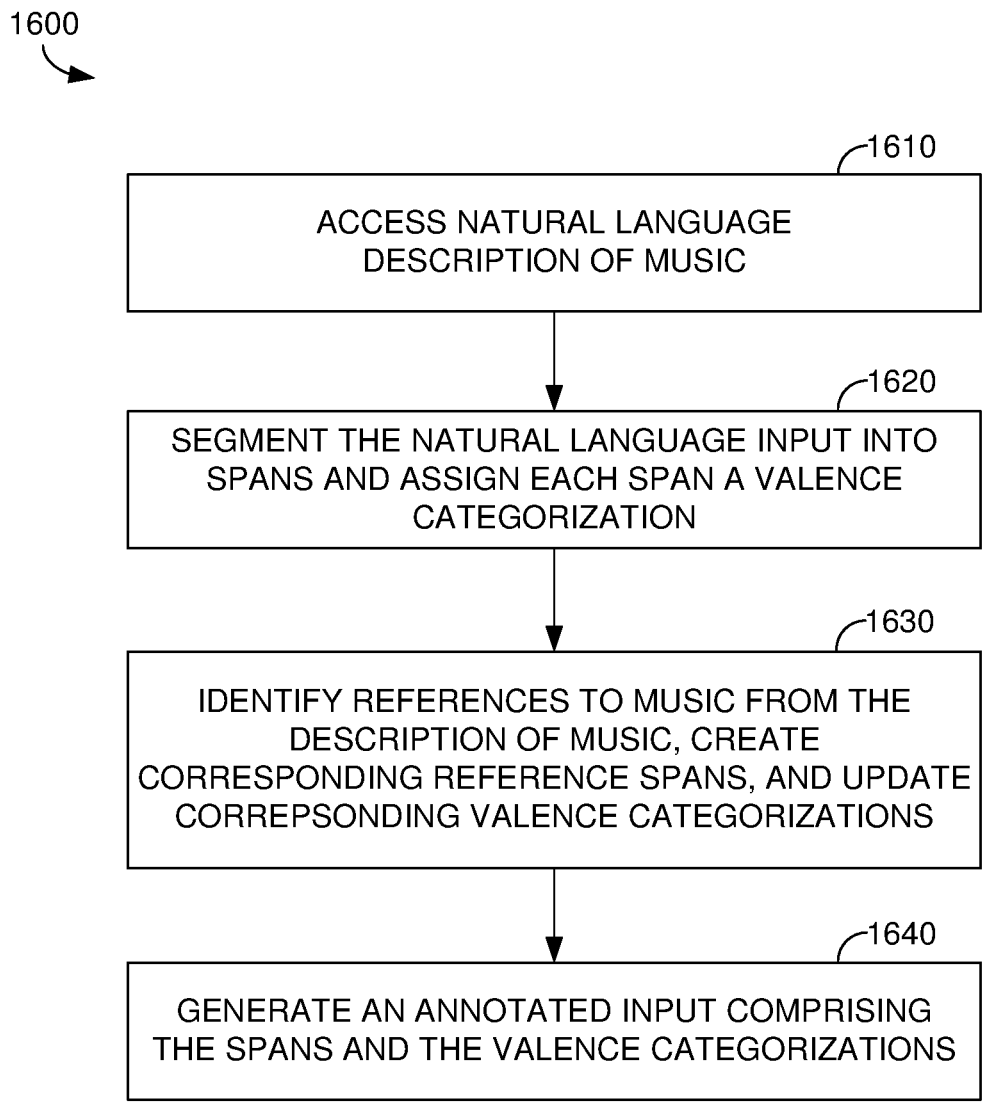
FIG. 16 is a flow diagram showing an exemplary method for generating an annotated input, in accordance with embodiments described herein.

Turning now to FIG. 16, a flow diagram is provided that illustrates a method 1600 for generating an annotated input. Initially at block 1610, a natural language description of music is accessed. At block 1620, the natural language input is segmented into spans, and each span is assigned a valence categorization. At block 1630, references to music are identified from the description of music, corresponding reference spans are created, and corresponding valence categorizations are updated. At block 1640, an annotated input is generated comprising the spans and the valence categorizations.

Figure 17:
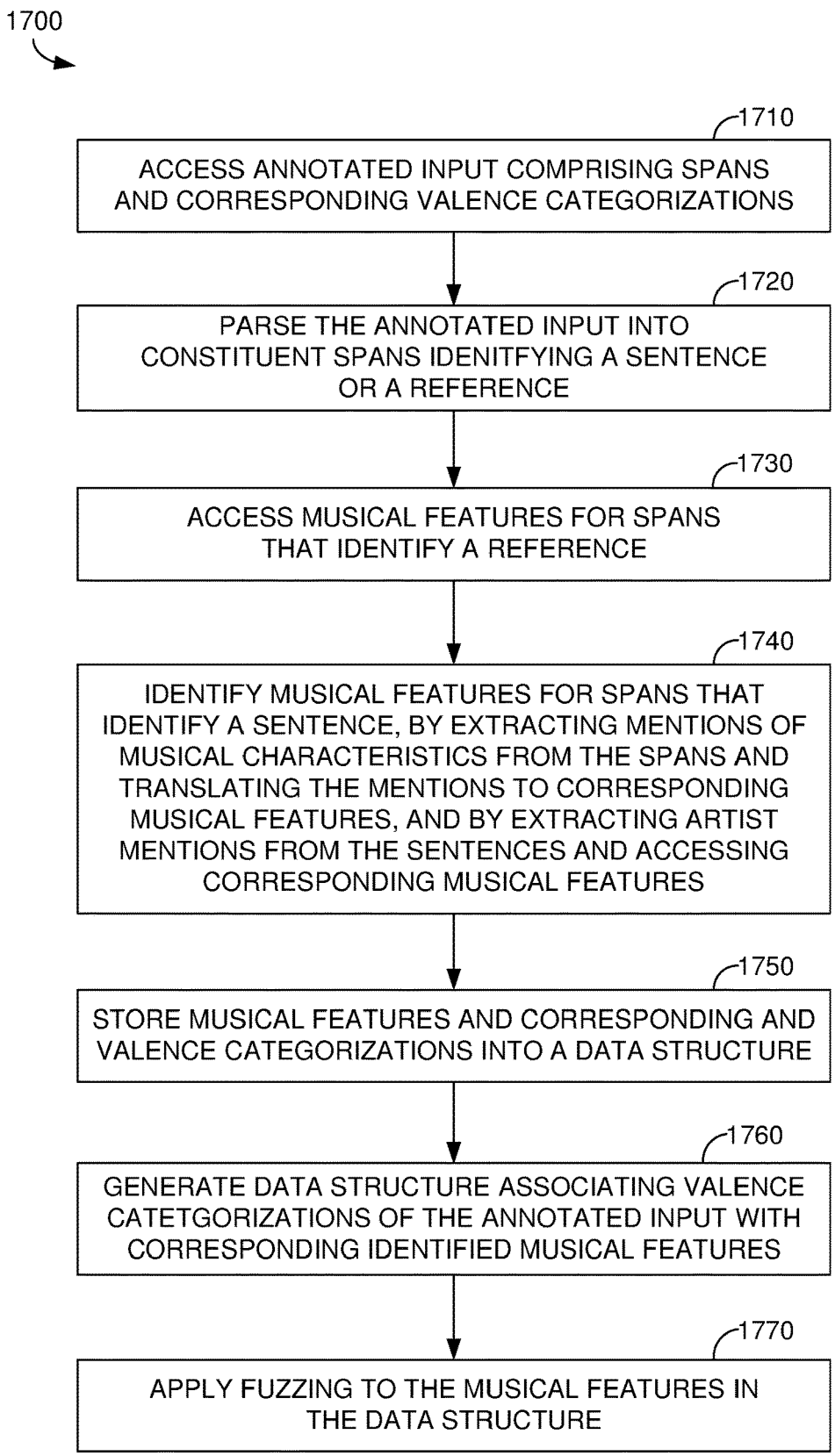
FIG. 17 is a flow diagram showing an exemplary method for generating schema features from an annotated input, in accordance with embodiments described herein.

Turning now to FIG. 17, a flow diagram is provided that illustrates a method 1700 for generating schema features from an annotated input. Initially at block 1710, an annotated input is accessed. The annotated input comprises spans and corresponding valence categorizations. At block 1720, the annotated input is parsed into constituent spans. Generally, the spans can identify a sentence or a reference from the annotated input. At block 1730, musical features are accessed for resolved references. For example, the musical features can be looked up from a reference database. At block 1740, musical features are identified for spans that identify a sentence. For example, mentions of musical characteristics are extracted from the spans, and the mentions are translated to corresponding musical features. Artist mentions are extracted from the spans, and corresponding musical features are accessed (e.g., from the reference database). At block 1750, the musical features are stored with corresponding valence categorizations in a data structure. At block 1760, one or more data structures are generated that associate the valence categorizations of the annotated input with corresponding identified musical features. At block 1770, fuzzing is applied to the musical features in the one or more data structures.

Figure 18:
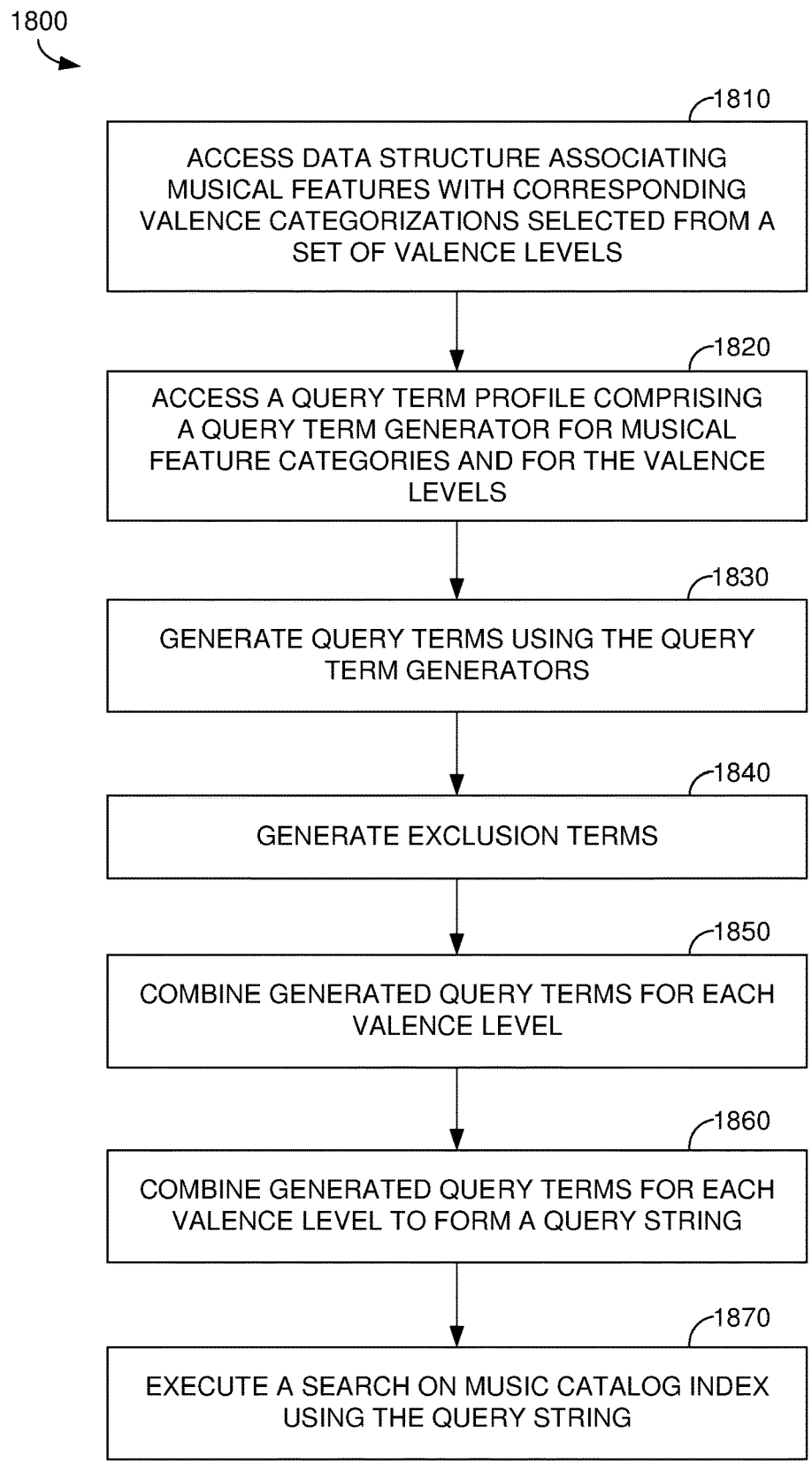
FIG. 18 is a flow diagram showing an exemplary method for executing a search based on a set of schema features, in accordance with embodiments described herein.

Turning now to FIG. 18, a flow diagram is provided that illustrates a method 1800 for executing a search based on a set of schema features. Initially at block 1810, one or more data structures are accessed that associate musical features with corresponding valence categorizations. The valence categorizations are selected from a set of valence levels. At block 1820, a query term profile is accessed. The query term profile comprises a query term generator for musical feature categories and for the valence levels. At block 1830, query terms are generated using the query term generators. At block 1840, exclusion terms are generated. At block 1850, generated query terms (including exclusion terms) are combined for each valence level. At block 1860, generated query terms for each valence level are combined to form a query string. At block 1870, a search is executed on a music catalog index using the query string.

Figure 19:
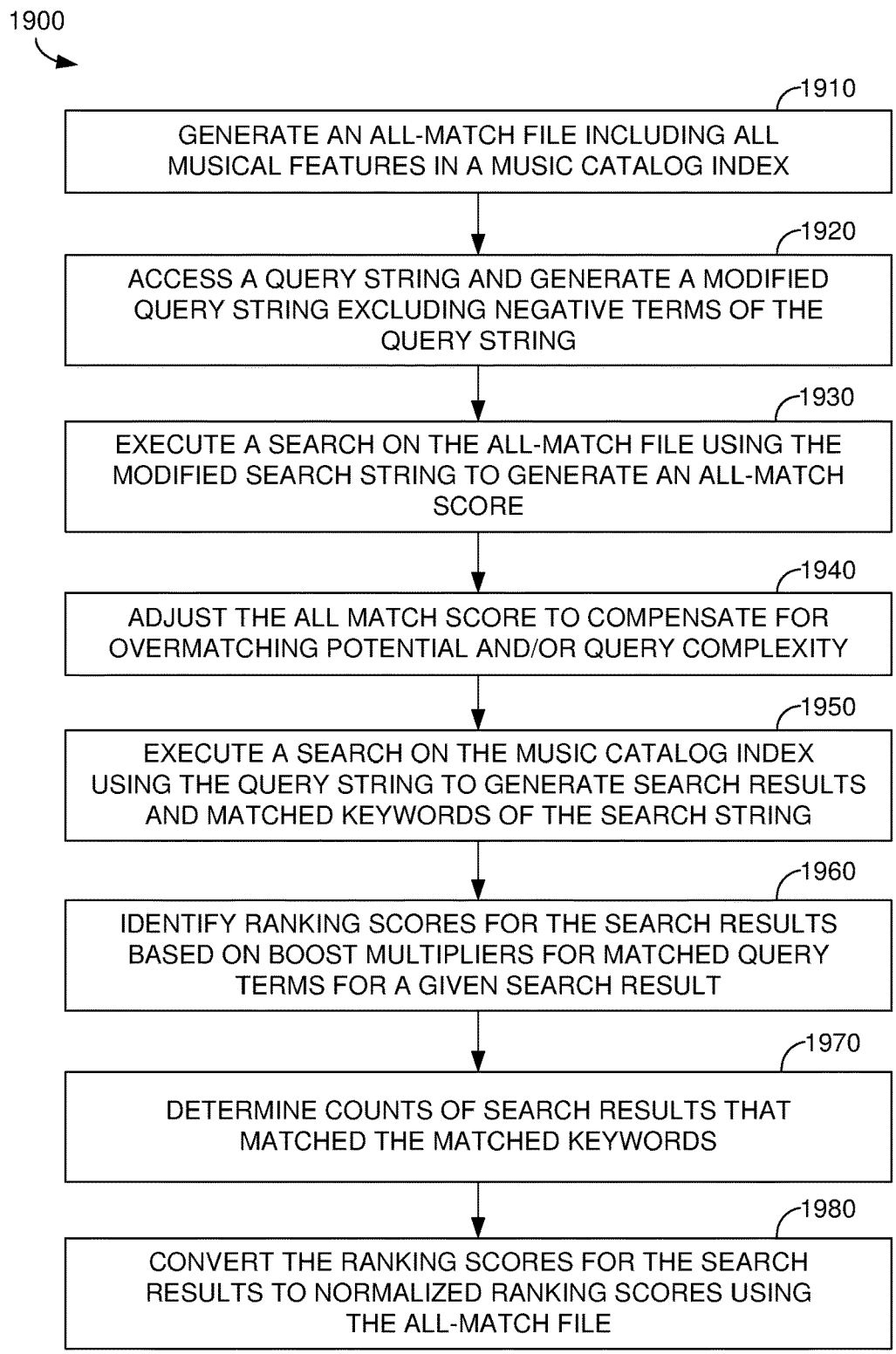
FIG. 19 is a flow diagram showing an exemplary method for ranking search results, in accordance with embodiments described herein.

Turning now to FIG. 19, a flow diagram is provided that illustrates a method 1900 for ranking search results. Initially at block 1910, an all-match file is generated. The all-match file includes all musical features appearing in a music catalog index. At block 1920, a query string is accessed and a modified query string is generated that excludes negative terms of the query string and transforms some terms of the query string. At block 1930, a search is executed on the all-match file using the modified search string to generate an all-match score. At block 1940, the all-match score is adjusted to compensate for overmatching and/or query complexity. At block 1950, a search is executed on the music catalog index using the query string to generate search results and matched keywords of the search string. At block 1960, ranking scores are identified for the search results based on boost multipliers for matched query terms for a given search result. At block 1970, counts of search results are determined that matched the matched keywords. At block 1980, the ranking scores for the search results are converted to normalized ranking scores using the all-match file.

Exemplary Operating Environment

Figure 20:
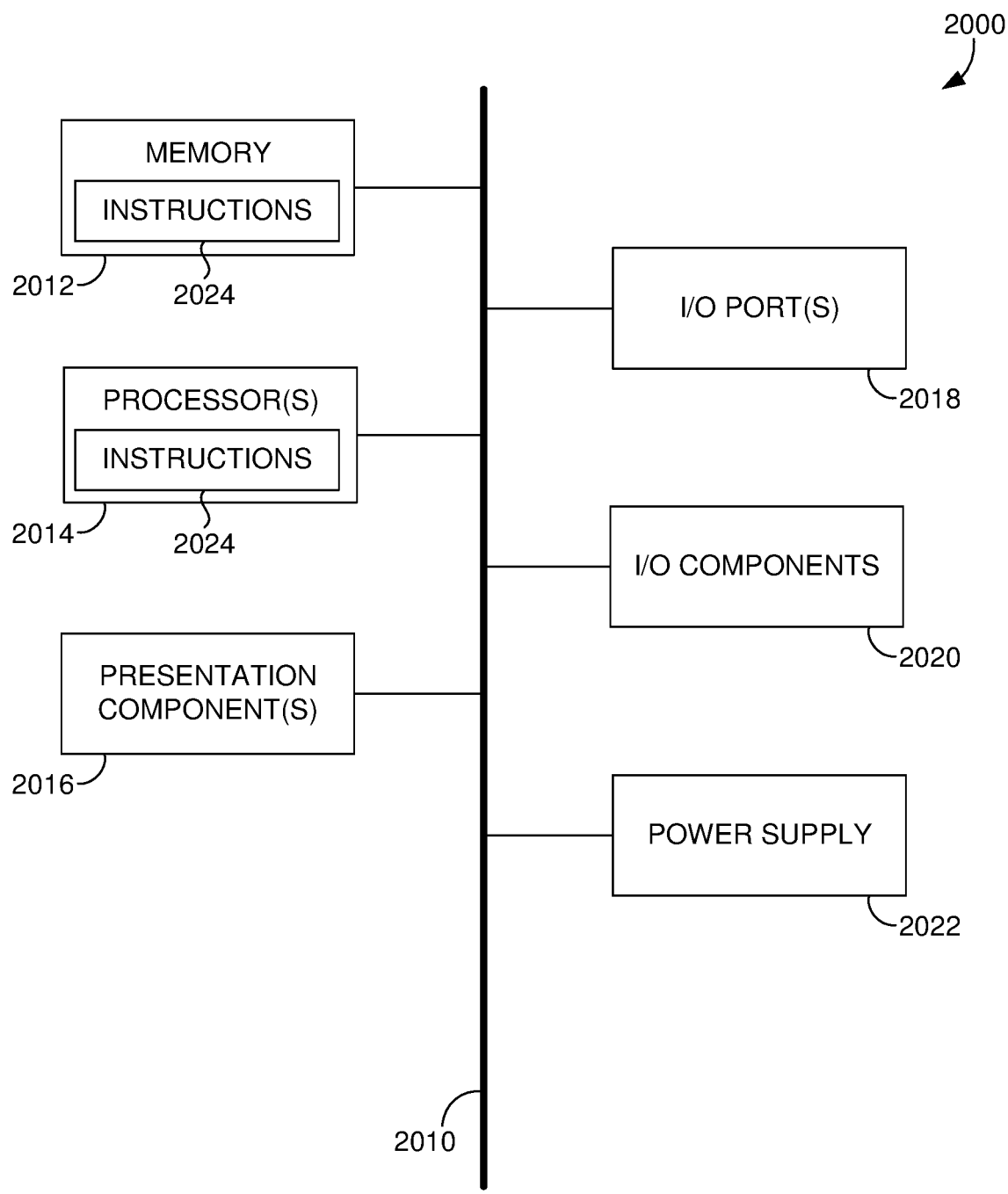
FIG. 20 is a block diagram of an exemplary computing environment suitable for use in implementing embodiments described herein.

Having described an overview of embodiments of the present invention, an exemplary operating environment in which embodiments of the present invention may be implemented is described below in order to provide a general context for various aspects of the present invention. Referring now to FIG. 20 in particular, an exemplary operating environment for implementing embodiments of the present invention is shown and designated generally as computing device 2000. Computing device 2000 is but one example of a suitable computing environment and is not intended to suggest any limitation as to the scope of use or functionality of the invention. Neither should the computing device 2000 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules (including routines, programs, objects, components, data structures, etc.), refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 20, computing device 2000 includes bus 2010 that directly or indirectly couples the following devices: memory 2012, one or more processors 2014, one or more presentation components 2016, input/output ports 2018, input/output components 2020, and illustrative power supply 2022. Bus 2010 represents what may be one or more buses (such as an address bus, data bus, or combination thereof). The various blocks of FIG. 20 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 20 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 20 and reference to "computing device."

Computing device 2000 typically includes a variety of computer-readable media. Computer-readable media can be any available media that can be accessed by computing device 2000 and includes both volatile and nonvolatile media, removable and non-removable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 2000. Computer storage media excludes signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 2012 includes computer storage media in the form of volatile and/or nonvolatile memory. The memory may be removable, non-removable, or a combination thereof. Exemplary hardware devices include solid-state memory, hard drives, optical-disc drives, etc. Computing device 2000 includes one or more processors that read data from various entities such as memory 2012 or I/O components 2020. Presentation component(s) 2016 present data indications to a user or other device. Exemplary presentation components include a display device, speaker, printing component, vibrating component, etc.

I/O ports 2018 allow computing device 2000 to be logically coupled to other devices including I/O components 2020, some of which may be built in. Illustrative components include a microphone, joystick, game pad, satellite dish, scanner, printer, wireless device, etc. The I/O components 2020 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 2000. The computing device 2000 may be equipped with depth cameras, such as stereoscopic camera systems, infrared camera systems, RGB camera systems, touchscreen technology, and combinations of these, for gesture detection and recognition. Additionally, the computing device 2000 may be equipped with accelerometers or gyroscopes that enable detection of motion. The output of the accelerometers or gyroscopes may be provided to the display of the computing device 2000 to render immersive augmented reality or virtual reality.

Embodiments described herein support the generation of search results from a natural language search request for music. The components described herein refer to integrated components for natural language searching. The integrated components refer to the hardware architecture and software framework that support natural language search functionality. The hardware architecture refers to physical components and interrelationships thereof and the software framework refers to software providing functionality that can be implemented with hardware embodied on a device.

The end-to-end software-based system can operate within system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions include any software, including low level software written in machine code, higher level software such as application software and any combination thereof. In this regard, the system components can manage resources and provide services for the natural language search functionality. Any other variations and combinations thereof are contemplated with embodiments of the present disclosure.

By way of example, a natural language search system can include an API library that includes specifications for routines, data structures, object classes, and variables may support the interaction between the hardware architecture of the device and the software framework of the natural language search system. These APIs include configuration specifications for the natural language search system such that the different components therein can communicate with each other in the natural language search system, as described herein.

Having identified various components in the present disclosure, it should be understood that any number components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

Moreover, although embodiments described above relate to a music description and categorization schema, any description and categorization schema can be implemented based on a desired domain (e.g., music, audio books, podcasts, videos, events, ticketing, real estate, etc.). Accordingly, some or all of the components and/or functions described above can be adapted to a desired domain, as would be understood by a person of ordinary skill in the art.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computerized method for generating search results from a natural language description of music, the method comprising:
    generating an annotated input identifying spans of the natural language description of music and corresponding valence categorizations selected from a set of valence levels;
    translating the annotated input to generate corresponding musical features of a music description and categorization schema;
    generating a feature map associating the musical features with corresponding ones of the valence categorizations;
    generating a query string using the feature map and a query term profile;
    executing a search using the generated query string on a catalog index to generate search results and corresponding ranking scores, wherein the catalog index is based on the music description and categorization schema; and
    providing the search results using the corresponding ranking scores.

2. The method of claim 1, wherein the generating of the annotated input additionally comprises identifying a musical reference from a reference span of the spans using one or more reference search patterns.

3. The method of claim 1, wherein the translating of the annotated input comprises identifying mentions of musical characteristics from the spans and searching a dictionary for the mentions, wherein the dictionary translates natural language to the musical features.

4. The method of claim 1, additionally comprising applying fuzzing to the generated musical features.

5. The method of claim 1:
    wherein the schema comprises categories within which the musical features are distributed;
    wherein the query term profile comprises a category query term generator for a first of the categories; and
    wherein the generating of the query string additionally comprises:
        generating a category query term for ones of the musical features in the category using the category query term generator; and
        generating the query string using the category query term.

6. The method of claim 1, additionally comprising normalizing the ranking scores of the search results.

7. The method of claim 1, wherein providing the search results causes a presentation of presenting a word cloud of matched musical features.

8. One or more computer storage media storing computer-useable instructions that, when used by one or more computing devices, cause the one or more computing devices to perform operations comprising:
 generating an annotated input identifying spans of the natural language description of music and corresponding valence categorizations selected from a set of valence levels;
 translating the annotated input to generate corresponding musical features of a music description and categorization schema;
 generating a feature map associating the musical features with corresponding ones of the valence categorizations;
 generating a query string using the feature map and a query term profile;
 executing a search using the generated query string on a catalog index to generate search results and corresponding ranking scores, wherein the catalog index is based on the music description and categorization schema; and
 providing the search results using the corresponding ranking scores.

9. The one or more computer storage media of claim 8, wherein the generating of the annotated input additionally comprises identifying a musical reference from a reference span of the spans using one or more reference search patterns.

10. The one or more computer storage media of claim 8, wherein the translating of the annotated input comprises identifying mentions of musical characteristics from the spans and searching a dictionary for the mentions, wherein the dictionary translates natural language to the musical features.

11. The one or more computer storage media of claim 8, wherein the operations additionally comprise applying fuzzing to the generated musical features.

12. The one or more computer storage media of claim 8, wherein the schema comprises categories within which the musical features are distributed;
 wherein the query term profile comprises a category query term generator for a first of the categories; and
 wherein the generating of the query string additionally comprises:
  generating a category query term for ones of the musical features in the category using the category query term generator; and
  generating the query string using the category query term.

13. The one or more computer storage media of claim 8, wherein the operations additionally comprise normalizing the ranking scores of the search results.

14. The one or more computer storage media of claim 8, wherein the providing of the search results causes a presentation of the search results includes a word cloud of matched musical features.

15. A system for generating search results from a natural language description of music, the system comprising:
 one or more hardware processors and memory configured to provide computer program instructions to the one or more hardware processors;
 an annotation component configured to utilize the one or more hardware processors to generate an annotated input identifying spans of the natural language description of music and corresponding valence categorizations selected from a set of valence levels;
 a translation component configured to utilize the one or more hardware processors to translate the natural language description of music into corresponding musical features of a music description and categorization schema and generate a feature map associating the musical features with corresponding ones of the valence categorizations; and
 a matchmaking component configured to utilize the one or more hardware processors to:
  generate a query string using the feature map and a query term profile; and
  execute a search using the generated query string on a catalog index to generate search results comprising matching songs and corresponding ranking scores, wherein the catalog index is based on the music description and categorization schema; and
  provide the search results using the corresponding ranking scores.

16. The system of claim 15, wherein the translation component is additionally configured to identify a musical reference from a reference span of the spans using one or more reference search patterns.

17. The system of claim 15, wherein the translation component is additionally configured to identify mentions of musical characteristics from the spans and search a dictionary for the mentions, wherein the dictionary translates natural language to the musical features.

18. The system of claim 15, wherein the translation component is additionally configured to apply fuzzing to the generated musical features.

19. The system of claim 15:
 wherein the schema comprises categories within which the musical features are distributed;
 wherein the query term profile comprises a category query term generator for a first of the categories; and
 wherein the generating of the query string additionally comprises:
  generating a category query term for ones of the musical features in the category using the category query term generator; and
  generating the query string using the category query term.

20. The system of claim 15, wherein the matchmaking component is configured to provide presentation of the search results, thereby causing a presentation of includes a word cloud of matched musical features.

* * * * *